(12) United States Patent
Va et al.

(10) Patent No.: US 12,386,011 B2
(45) Date of Patent: Aug. 12, 2025

(54) METHOD AND APPARATUS FOR IN-HOUSE RF-BASED COLLABORATIVE LOCALIZATION WITH AUTOMATED DATA COLLECTION

(71) Applicant: Samsung Electronics Co., Ltd., Suwon-si (KR)

(72) Inventors: Vutha Va, Plano, TX (US); Wenxun Qiu, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 673 days.

(21) Appl. No.: 17/512,446

(22) Filed: Oct. 27, 2021

(65) Prior Publication Data

US 2022/0163615 A1    May 26, 2022

Related U.S. Application Data

(60) Provisional application No. 63/118,496, filed on Nov. 25, 2020.

(51) Int. Cl.
*G01S 5/00* (2006.01)
*H04W 4/029* (2018.01)

(52) U.S. Cl.
CPC ............ *G01S 5/013* (2020.05); *G01S 5/0036* (2013.01); *G01S 5/0063* (2013.01); *H04W 4/029* (2018.02)

(58) Field of Classification Search
CPC ...... G01S 5/013; G01S 5/0036; G01S 5/0063; G01S 5/0252; G01S 5/0236;
(Continued)

(56) References Cited

U.S. PATENT DOCUMENTS 8,531,288 B1    9/2013   Khan et al.
10,267,893 B2   4/2019   Gonia et al.
(Continued)

FOREIGN PATENT DOCUMENTS

WO    2017/196583 A1    11/2017
WO    2021023377 A1    2/2021

OTHER PUBLICATIONS

International Search Report dated Mar. 21, 2022 in connection with International Patent Application No. PCT/KR2021/016498, 5 pages.
(Continued)

*Primary Examiner* — Alison Slater
*Assistant Examiner* — Jing Gao

(57) ABSTRACT

A method for localization includes obtaining a request to localize an electronic device within an area, wherein the area includes a set of anchors. The method also includes transmitting a first message to the electronic device and a second message to the set of anchors. the first message includes a time for the electronic device to transmit a measurement signal and the second message includes the time for the set of anchors to receive the measurement signal from the electronic device. The method further includes receiving, from the set of anchors, signal information associated with the measurement signal. Additionally, the method includes identifying a location of the electronic device within the area based on the signal information. The method also includes transmitting, to the electronic device, the location of the electronic device within the area.

20 Claims, 17 Drawing Sheets

(58) Field of Classification Search
CPC ........ G01S 5/0054; G01S 5/14; G01S 5/0289;
G01S 5/0284; G01S 1/024; G01S 1/042;
G01S 1/20; G01S 13/765; G01S 19/03;
G01S 5/0027; G01S 19/42; G01S 5/30;
G01S 11/06; G01S 5/0009; G01S 5/0018;
G01S 5/0045; G01S 5/0215; G01S
1/0428; G01S 13/767; G01S 5/0244;
G01S 7/40; H04W 4/029; H04W 4/33;
H04W 4/02; H04W 4/70; H04W 4/38;
H04W 4/80; H04W 4/35; H04W 4/021;
H04W 88/04; H04W 84/18; H04W 64/00;
H04W 88/06; H04W 8/005; H04W 4/30;
H04W 4/023; H04W 84/005; H04W
36/0033; H04W 16/14; H04W 24/02;
H04W 4/50; H04W 88/02; H04W 4/025;
H04W 76/11; H04W 40/20; H04W
28/0215; H04W 28/0226
See application file for complete search history.

(56) References Cited

U.S. PATENT DOCUMENTS

| | | |
|---|---|---|
| 10,794,983 B1 | 10/2020 | Chandail et al. |
| 2010/0189082 A1* | 7/2010 | Choi .................... H04W 64/00 370/336 |
| 2012/0063340 A1 | 3/2012 | Waters et al. |
| 2018/0206065 A1* | 7/2018 | Moshfeghi ............ H04W 4/027 |
| 2019/0239181 A1* | 8/2019 | Gangakhedkar ...... H04W 64/00 |
| 2019/0349244 A1* | 11/2019 | Ameixiera ........ H04W 56/0025 |
| 2020/0200892 A1 | 6/2020 | Rajab et al. |
| 2020/0287590 A1* | 9/2020 | Torborg ............... H04B 1/7183 |
| 2020/0319289 A1 | 10/2020 | Borsos et al. |
| 2020/0404450 A1 | 12/2020 | Duan et al. |
| 2021/0029500 A1 | 1/2021 | Ye et al. |

OTHER PUBLICATIONS

Written Opinion of the International Searching Authority dated Mar. 21, 2022 in connection with International Patent Application No. PCT/KR2021/016498, 5 pages.

* cited by examiner

METHOD AND APPARATUS FOR IN-HOUSE RF-BASED COLLABORATIVE LOCALIZATION WITH AUTOMATED DATA COLLECTION

CROSS-REFERENCE TO RELATED APPLICATION AND CLAIM OF PRIORITY

This application claims priority under 35 U.S.C. § 119(e) to U.S. Provisional Patent Application No. 63/118,496 filed on Nov. 25, 2020. The above-identified provisional patent application is hereby incorporated by reference in its entirety.

TECHNICAL FIELD

This disclosure relates generally to localizing an electronic device. More specifically, this disclosure relates to in-house RF-based collaborative localization with automated data collection.

BACKGROUND

The use of mobile computing technology has greatly expanded largely due to usability, convenience, computing power, and the like. One result of the recent technological development is that electronic devices are becoming more compact, while the number of functions and features that a given device can perform is increasing, such as localizing a device within an environment. For example, in wireless communication applications, various wireless electronic devices can be located within a given environment. Localizing a wireless electronic device within an environment can be based on comparing the distance between the wireless electronic device to other wireless electronic devices within the environment as identified based on signals transmitted between the wireless devices. However localization may not be possible when there are not enough devices for localization purposes. Additionally, data collection for fingerprinting the environment for localization can be cumbersome.

SUMMARY

This disclosure provides in-house RF-based collaborative localization with automated data collection.

In a first embodiment, a method for localization is provided. The method includes obtaining a request to localize an electronic device within an area, wherein the area includes a set of anchors. The method also includes transmitting a first message to the electronic device and a second message to the set of anchors. the first message includes a time for the electronic device to transmit a measurement signal and the second message includes the time for the set of anchors to receive the measurement signal from the electronic device. The method further includes receiving, from the set of anchors, signal information associated with the measurement signal. Additionally, the method includes identifying a location of the electronic device within the area based on the signal information. The method also includes transmitting, to the electronic device, the location of the electronic device within the area.

In another embodiment, an electronic device is provided. The electronic device includes a transceiver and a processor. The processor is configured to obtain a request to localize an electronic device within an area, wherein the area includes a set of anchors. The processor is also configured to transmit a first message to the electronic device and a second message to the set of anchors. The first message includes a time for the electronic device to transmit a measurement signal and the second message includes the time for the set of anchors to receive the measurement signal from the electronic device. The processor is further configured to receive, from the set of anchors, signal information associated with the measurement signal. Additionally, the processor is configured to identify a location of the electronic device within the area based on the signal information. The processor is also configured to transmit, to the electronic device, the location of the electronic device within the area.

In yet another embodiment a non-transitory computer readable medium embodying a computer program is provided. The computer program comprising computer readable program code that, when executed by a processor of an electronic device, causes the processor to: obtain a request to localize an electronic device within an area, wherein the area includes a set of anchors; transmit a first message to the electronic device and a second message to the set of anchors, wherein the first message includes a time for the electronic device to transmit a measurement signal and the second message includes the time for the set of anchors to receive the measurement signal from the electronic device; receive, from the set of anchors, signal information associated with the measurement signal; identify a location of the electronic device within the area based on the signal information; and transmit, to the electronic device, the location of the electronic device within the area.

In another embodiment, a method for localization by an electronic device is provided. The method includes transmitting, to a localization system coordinator (LSC) device, a request to receive a localization model with implicit labels, wherein the localization model is generated based on measurement signals received from a set of anchors positioned throughout an area. The method also includes receiving, from the LSC device, the localization model. The method further includes identifying measurements from signals generated by two or more anchors of the set of anchors. Additionally, the method includes identifying a location of the electronic device based on the measurements from the signals and the localization model.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
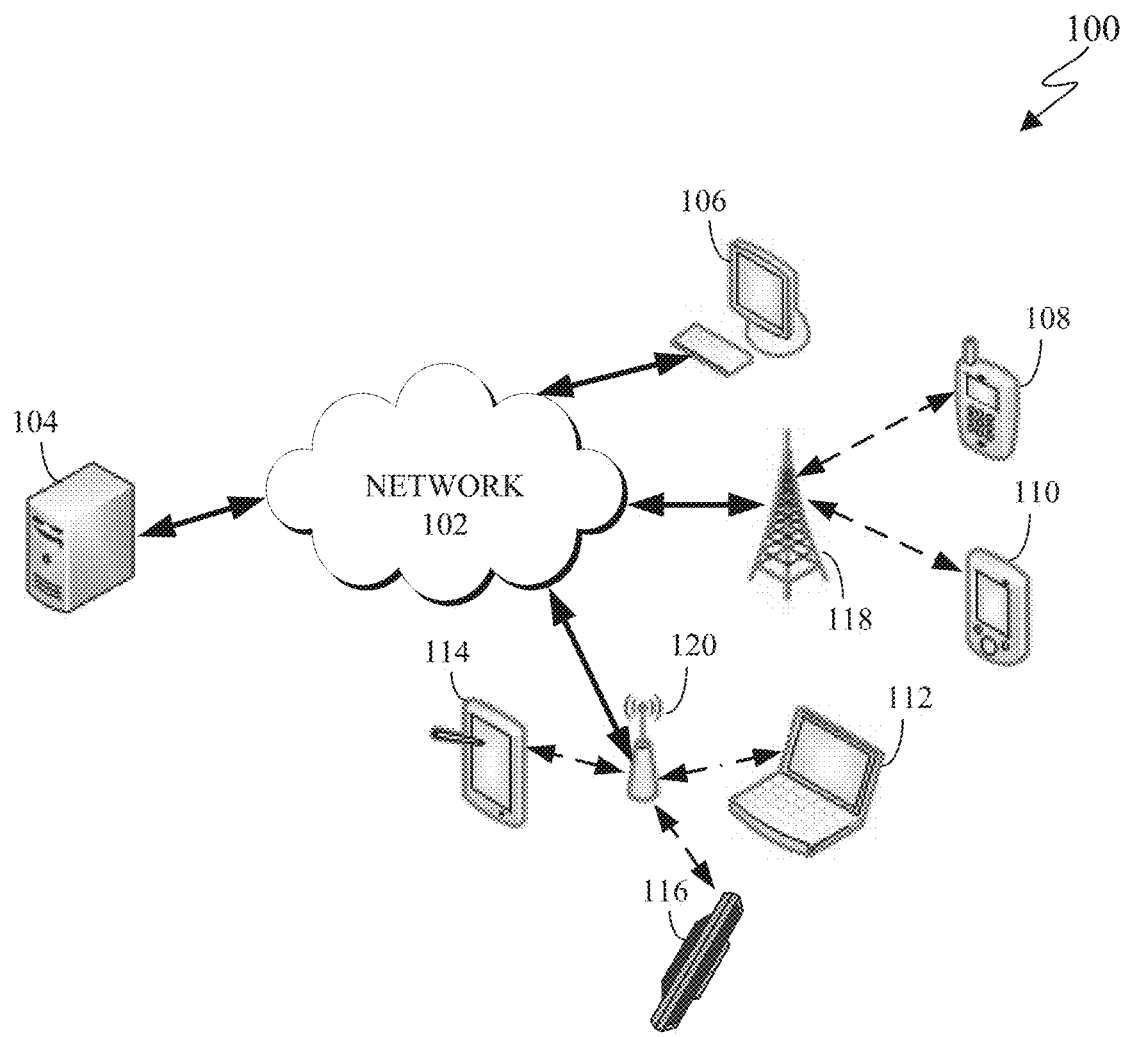
FIG. 1 illustrates an example communication system in accordance with an embodiment of this disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: (i) IEEE 802.11: Wireless Medium Access Control (MAC) and Physical Layer (PHY) Specifications: (2016 revision); and (ii) "OCF Device Specification v2.2.0," Open Connectivity Foundation, July 2020.

An electronic device, according to embodiments of the present disclosure, can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device can be a wireless access point such as a Wi-Fi router. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Radio frequency (RF) signals (such as Wi-Fi signals) can be used for localizing an electronic device within a defined area (environment). Using RF signals for localization can be referred to as fingerprinting. The process of fingerprinting can be used for localizing an electronic device within an area. Generally, fingerprinting is based on a database of measurements of a region of interest (such as a given environment). The measurements can be divided into a grid which is used for matching a current RF signature to points in the database. Various machine learning solutions can be utilized to perform the matching.

Embodiments of the present disclosure take into consideration that localization based on fingerprinting is not practical in a home setting. For example, fingerprinting refers to RF measurements that are taken at fixed nodes, denoted as anchors. Generally access points (such as Wi-Fi gateways) are selected to act as anchors. However, in a typical home, the number of access points is limited, since, depending on the size of the home, one or two access points are needed for providing Wi-Fi coverage throughout the home. Additionally, the access points are spaced throughout the house such that only one or two can be seen at any given location. The number and location of access points is ideal for networking perspective (providing Wi-Fi throughout a home) but provides poor localization services.

Additionally, manual data collection for fingerprinting is not practical in a home. For example, data collection is performed by dividing the environment of interest into a grid and measurements are collected from each point on the grid. This process is laborious, cumbersome, and expensive and often not practical to be performed in a home of each user.

Accordingly, embodiments of the present disclosure describe methods for an RF based localization service. That is, the embodiments of the present disclosure address the limited number of anchors in the environment, and cumbersome task of collecting training data. The embodiments of the present disclosure provide an architecture for performing the localization service in a given environment, such as a person's home. For example, access points that are used as anchors in public venues such as an airport or a mall, are possible since multiple access points can be seen simultaneously by a device for localization purposes. However, in a home setting, such an assumption is no longer valid, since there are only few access points installed in a house, and in most cases zero or one access point can be seen at a time. Therefore, embodiments of the present disclosure take into consideration that using only access points for anchors for localization could become the performance bottleneck.

Regarding the limited number of anchors in a home, embodiments of the present disclosure recognize that the number of APs are limited, while the number of Wi-Fi capable devices is increasing. As such, for RF-based localization purpose, immobile devices could be used in addition to access points instead of relying solely on access points. An 'immobile device' is defined as any device that is moved infrequently (for example, months or years). Some examples of immobile devices include a smart refrigerator, TV, printer, desktop computer, security cameras, and the like. For example, embodiments as disclosed herein expands the number of anchors to include any immobile Wi-Fi-capable devices in the environment. Since the number of Wi-Fi capable devices is increasing, there will be more and more anchors that could be used, and thus the localization performance can continue to improve.

Regarding the cumbersome task of collecting training data, embodiments of the present disclosure recognize that by collecting RF measurements from devices with known location, localization training data can be autonomously collected. The devices can be immobile devices or mobile devices under special circumstances. For example, when a mobile phone is being charged via a cable to an electrical outlet, localization training data can be autonomously collected from the mobile phone. Such automatic data collection can provide implicit labels (such as P1, P2, P3, . . . with no interpretable meaning; they only allow the distinction between different locations). If explicit labels (such as living room, kitchen or bedroom etc.) are desirable, they may be requested from the human user. Because such labels are only needed once after obtaining the dataset (to provide a mapping between implicit label to explicit label, such as, relating the implicit label of P1 to the kitchen, and the like), it places little burden on the human user. It is noted that not all applications use explicit location labels. For example, for applications that target customized experience based on historical usage of the device can operate with implicit location labels (they only need to distinguish different locations).

Regarding the architecture for performing a localization service in a given environment, embodiments of the present disclosure describe several architectures for operating such a location service. For example, location computation can be performed by the anchors (which could be immobile devices or access point) and not at the mobile device using the service. This architecture can provide fast localization as well as allowing devices with low computational power (such as a wearable fitness band) to use the localization service as most computation will be done at the anchors.

Therefore, embodiments of the present disclosure provide systems and methods for coordinating, by one or more anchors selected from the plurality of anchors, distributed data collection and localization model creation from a plurality of anchors and mobile devices. Embodiments of the present disclosure also provide systems and methods for performing semantic/explicit labeling of locations for the model via the data collection.

It is noted that the embodiments disclosed herein are described using Wi-Fi, however any other wireless technology can be used. Additionally, while there are various methods to conduct Wi-Fi-based localization under different conditions and performance levels (triangulation method, time-of-arrival estimation, etc.), the embodiments disclosed herein will focus on fingerprinting-based approach. In a fingerprinting-based solution, a device that wants to localize itself measures RF signals from various transmitters (denoted as anchors) and inputs those measurements to a trained model that will output a location estimate of the device.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate internet protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a head mounted display (HMD), or the like. The server 104 can represent one or more servers.

Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102.

Each client device 106-116 represents any suitable computing or processing device that interacts with at least one server (such as the server 104) or other computing device(s) over the network 102. In this example, the client devices 106-116 include a desktop computer 106, a mobile telephone or mobile device 108 (such as a smartphone), a PDA 110, a laptop computer 112, a tablet computer 114, and a television 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-116 can emit and collect signals via a measuring transceiver. For example, any of the client devices 106-116 can emit and collect RF signals.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112 the tablet computer 114, and the television 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used for localizing an electronic device. In certain embodiments, any of the client devices 106-116 transmit information securely and efficiently to another device, such as, for example, the server 104, the access point 120, or any other one of the client devices 106-116.

In certain embodiments, any of the client devices 106-116 or the server 104 can localize another one of the client devices 106-116. As illustrated, the television 116 can be an immobile device since televisions are not moved on a regular basis. When the television 116 is considered an 'immobile device,' which is a device that is moved infrequently, the television 116 is considered an anchor for localizing another one of the client devices 106-114.

As illustrated, the mobile device 108 can communicate with the laptop computer 112, the access point 120, and any other client device. Based on the wireless signals which are communicated between these devices, a localization system coordinator (LSC), which can be the laptop computer 112, the access point 120, and any other client device, can identify the location of the mobile device 108 relative to the devices with which it communicates with.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
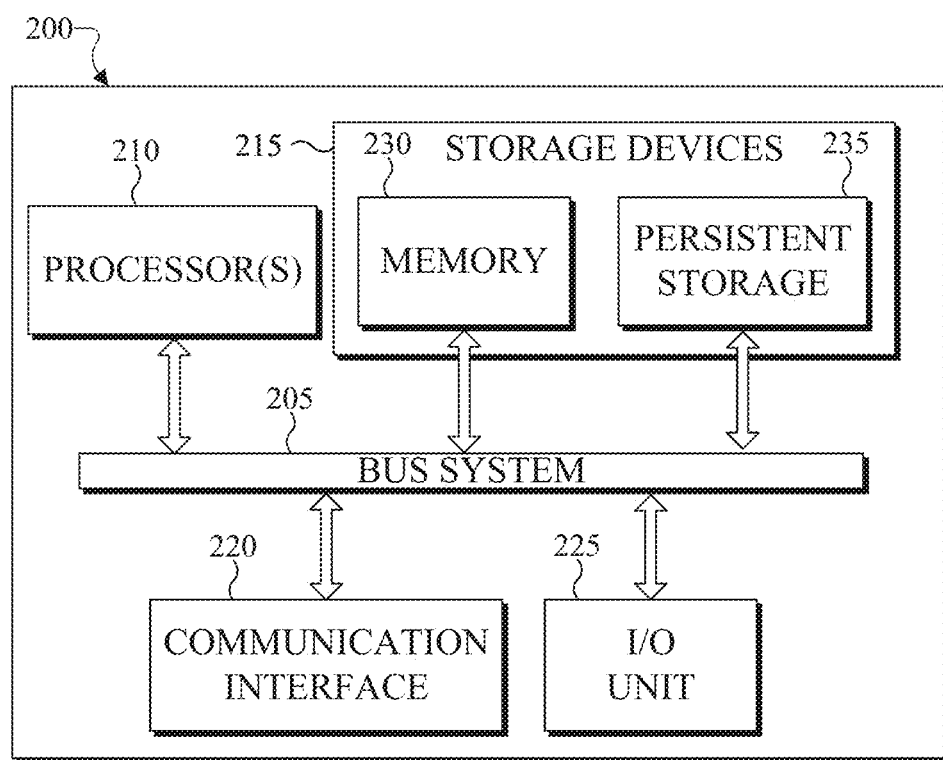
FIGS. 2 and 3 illustrate example electronic devices in accordance with an embodiment of this disclosure.
Figure 3:
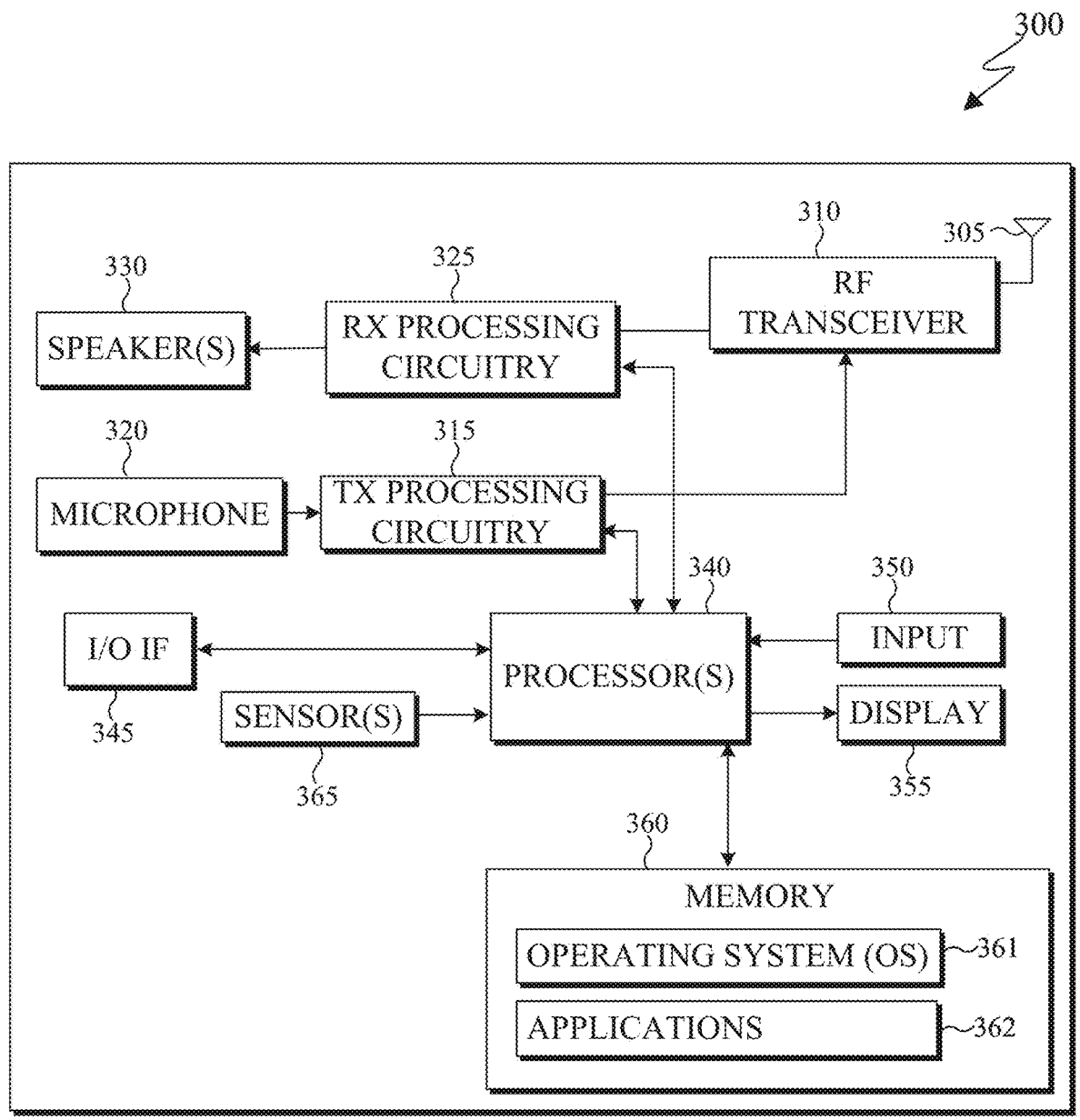

FIGS. 2 and 3 illustrate example electronic devices in accordance with an embodiment of this disclosure. In particular, FIG. 2 illustrates an example electronic device 200, and the electronic device 200 could represent the server 104 in FIG. 1. The electronic device 200 can represent one or more local servers, remote servers, clustered computers, and components that act as a single pool of seamless resources, a cloud-based server, and the like. In certain embodiments, the electronic device 200 can represent an access point, such as the access points 120. The electronic device can also represent a localization system coordinator (LSC) that coordinates the location services within the environment. The electronic device 200 can be accessed by one or more of the client devices 106-116 of FIG. 1 or another server.

As shown in FIG. 2, the electronic device 200 includes a bus system 205 that supports communication between at least one processing device (such as a processor 210), at least one storage device 215, at least one communication interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can generate a localization model based on measurement signals from various anchors within the environment.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for localizing an electronic device within an environment. The persistent storage 235 can contain one or more components or devices supporting longer-term storage of data, such as a read only memory, hard drive, Flash memory, or optical disc.

The communication interface 220 supports communications with other systems or devices. For example, the communication interface 220 could include a network interface card or a wireless transceiver facilitating communications over the network 102 of FIG. 1. The communication interface 220 can support communications through any suitable physical or wireless communication link(s). For example, the communication interface 220 can transmit a localization map to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the electronic device 200 occur via a network connection.

It is noted that the same or similar structure of the electronic device 200 of FIG. 2 could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, a desktop computer (similar to the desktop computer 106 of FIG. 1), a portable electronic device (similar to the mobile device 108, the PDA 110, the laptop computer 112, or the tablet computer 114 of FIG. 1), an immobile electronic device (such as an appliance similar to a refrigerator, an oven), and the like. In certain embodiments, one or more of the client devices 106-116 of FIG. 1 can include the same or similar configuration as the electronic device 300. In certain embodiments, the electronic device 300 is usable with localization.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361 and one or more applications 362.

The RF transceiver 310 can include an antenna array including numerous antennas, such as the antenna 305. The antennas of the antenna array can include a radiating element composed of a conductive material or a conductive pattern formed in or on a substrate. The transceiver(s) 310 transmit and receive a signal or power to or from the electronic device 300. For example, the RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry. In certain embodiments, the processor 340 includes a neural network.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include localization services, a camera application, a video phone call application, an email client, a social media client, a SMS messaging client, a virtual assistant, and the like.

The processor 340 is also coupled to the I/O interface 345 that provides the electronic device 300 with the ability to connect to other devices, such as client devices 106-116. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user to interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD).

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein. Any of these sensor(s) 365 may be located within the electronic device 300 or within a secondary device operably connected to the electronic device 300.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
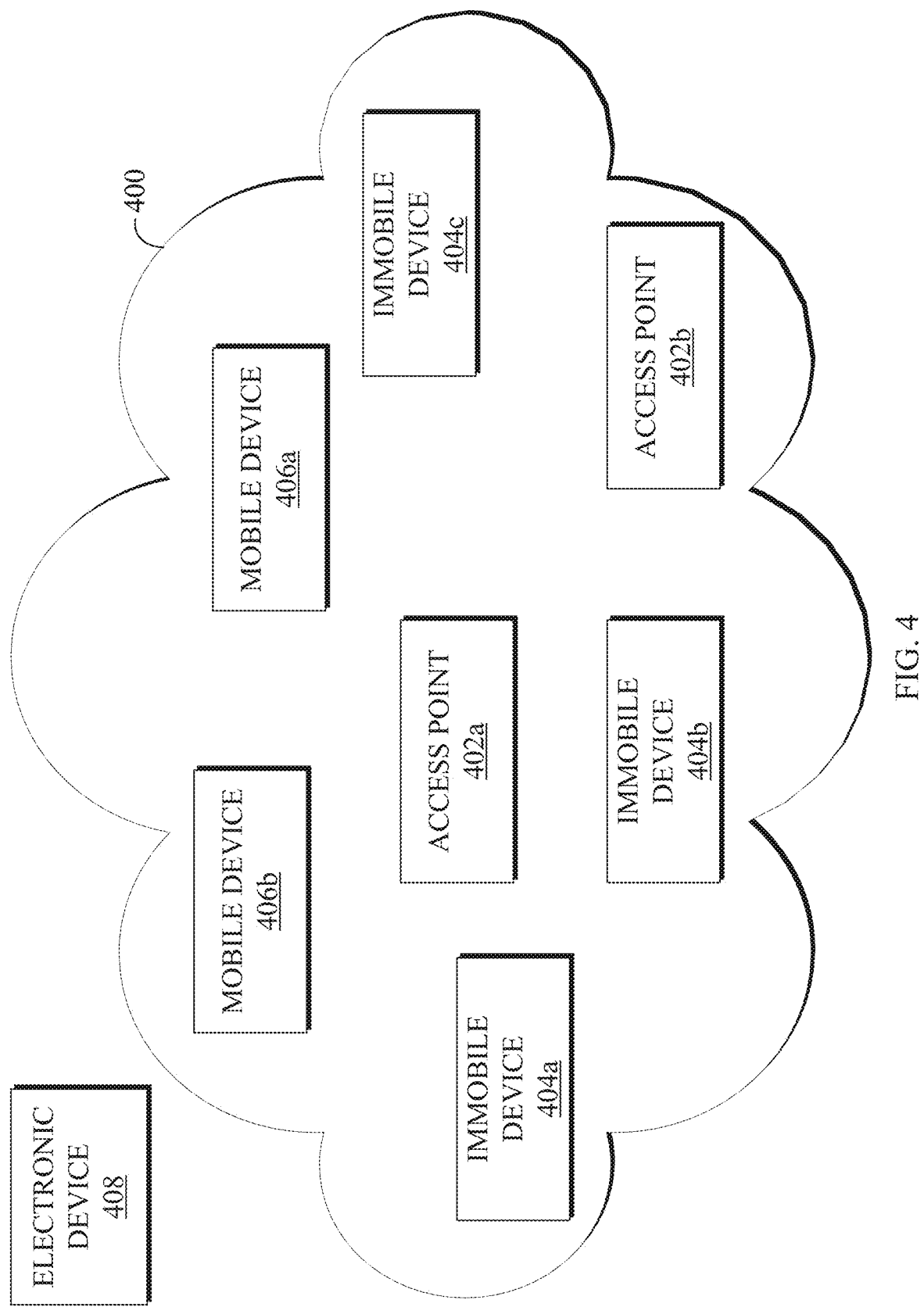
FIG. 4 illustrates an example architecture of a localization system in accordance with an embodiment of this disclosure.

FIG. 4 illustrates an example architecture of a localization system in accordance with an embodiment of this disclosure. The architecture, as shown in FIG. 4, describes a Wi-Fi-based localization system. The localization system can be located within a particular environment such as a person's home, place of work, and the like. As indicated above, the localization system can use other wireless communication instead of Wi-Fi. In this embodiment, the learned localization model is generated at one of the anchors as well as the computation to determine the location are performed at one or more of the anchors and not at the electronic device 408 as shown in FIG. 4.

The architecture of FIG. 4 is for providing a localization service within a particular environment, such as the home of a user. The localization service enables the electronic device 408 to localize itself relative to the other anchors within the network 400. Here, the anchors for the localizations are taken to be various Wi-Fi-capable devices that are positioned throughout the environment. The Wi-Fi-capable devices include access points (AP) 402a and 402b (collectively AP 402), as well as various immobile Wi-Fi devices such as immobile devices 404a, 404b, and 404C (collectively immobile device 404). As shown in FIG. 4, the trained localization model resides in the collective of the anchors. This means one or more anchors store the trained model and those anchors will response to localization request from the electronic device 408.

In certain embodiments, one of the anchors (AP 402a, AP 402b, immobile device 404a, immobile device 404b, or immobile device 404C) within the network 400 may act as a Localization Service Coordinator (LSC). The LSC can handle the training data collection, maintenance of the trained model(s), as well as coordination to provide the localization service. In this architecture, one of the anchors (can be an AP or non-AP device) could act as the LSC, which is responsible for coordinating the localization training data collection as well as providing the localization service.

Figure 5:
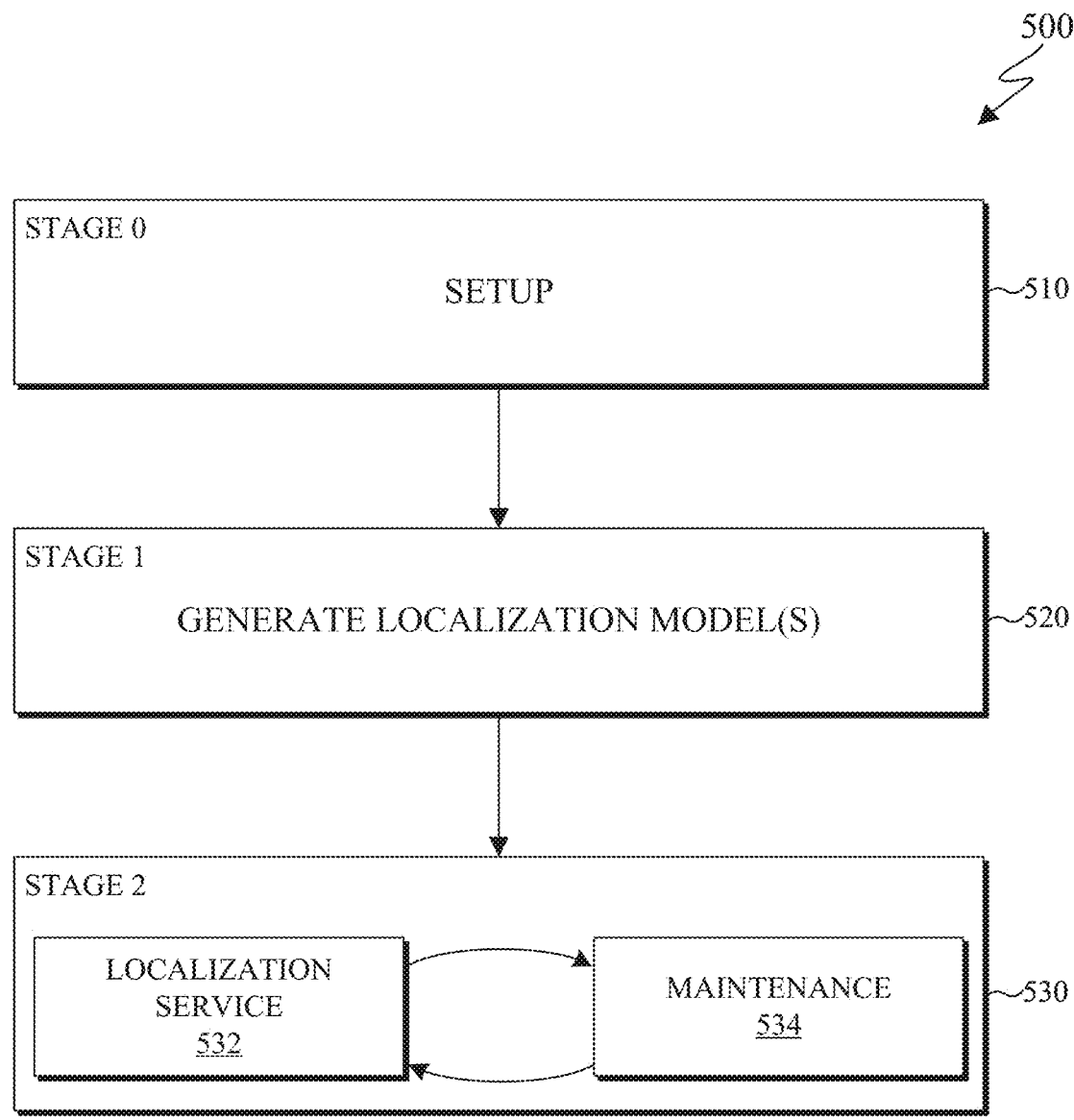
FIG. 5 illustrates a method for a localization system in accordance with an embodiment of this disclosure.

Although FIG. 4 illustrates an example architecture of a localization system, various changes may be made to FIG. 4. For example, more or less devices, of varying types can be included in the network 400, FIG. 5 illustrates a method 500 for a localization system in accordance with an embodiment of this disclosure. The method 500 is described as implemented by any one of the client device 106-116 of FIG. 1, the server 104 of FIG. 1, the access point 120 of FIG. 1, any of the access points 402, or any of the immobile devices 404 of FIG. 4 and can include internal components similar to that of electronic device 200 of FIG. 2 and the electronic device 301 of FIG. 3. However, the method 500 as shown in FIG. 5 could be used with any other suitable electronic device and in any suitable system.

The method 500 describes that the localization system is separated into three steps denoted as step 510 (also denoted as stage 0), step 520 (also denoted as stage 1), and step 530 (also denoted as stage 2).

During step 510 the LSC selects various devices within the environment and registers the selected devices as anchors. Once the LSC performs selection and setup, the localization system is separated into two stages: the initial data collection stage (stage 1 corresponding to step 520) and the service operation and maintenance stage (stage 2 corresponding to step 530). During step 520, the LSC coordinates and collects training data to train the initial localization model(s). Once the initial localization model(s) are obtained the system is functional and can provide localization service to an electronic device requesting its location within the environment. For example, during step 530 the LSC can provide localization service 532 as well as continue collecting training data in step 534 for maintenance purpose (to be able to get measurements in the latest house environment, which could change over time).

At the very start of the deployment, in step 510, one of the eligible devices (such as an AP or a non-AP immobile device) is be selected as the LSC. In certain embodiments, the selection is based on a predefined protocol that considers both the device capability (such as computational power and storage) and availability. In certain embodiments, the selection is based on a human operator with a potentially strategic placement inside the house. For example, the LSC could reach most areas in the house.

Once the LSC is selected, at step 520, the LSC starts the first stage, which is the initial data collection. At this stage, since there is not enough data to train a localization model yet, the service may not yet be provided. The LSC may start with registering devices before it starts the actual data collection. The data collection is done by requesting cooperation from localization-capable devices. Some of those devices may act as anchors, and some may help in the data collection. For example, only immobile devices (including APs) may act as anchors. Mobile devices such as a smart phone (such as the mobile device 108 of FIG. 1), fitness band, AR glasses, and the like, may only help in data collection.

In certain embodiments, for devices (such as any of the client devices 106-116 of FIG. 1) to participate in the localization service (either as anchors or as a consumer/user of the service), there is a registration procedure with the LSC. The registration could be implicit or explicit. In an implicit registration approach, the LSC would broadcast a request for cooperation for localization (could be during the data collection process or when providing localization service to a device; detailed procedures provided later). The LSC would then collect the responses and register the devices that meet the appropriate criteria. If a response belongs to an immobile device, that device could be a potential anchor for the localization, and the LSC could register that device in the list of available anchors. To determine if a device is immobile, the LSC may check the device type of the responder. An example of a concrete list of device types may be something similar to the list defined in the OCF device specification by the Open Connectivity Foundation (OCF). For the user utilizing the localization service, there is no registration required; the user could send a localization request to the LSC and the LSC may response accordingly. Note that in this case there is no explicit authentication step, but only devices connected to the network may participate; the security can be handled by the network authentication implicitly, and only authorized network users can participate in the localization service.

In an explicit registration approach, each device (such as any of the client devices 106-116 of FIG. 1) can send a registration request to the LSC. The device could be registered as an anchor or as a consumer of the service. The device could indicate its capability (such as whether the device can serve as an anchor) in the registration request. The LSC is responsible for determining whether a device can be an anchor. For example, only immobile devices may be registered as anchors. Before the registration can happen, the LSC may first need to authenticate the requesting device. In this case, during the localization operation (either anchors or user requesting to localize itself), the LSC only accepts responses from devices already registered (and thus authenticated).

Once the devices are registered, FIG. 9A, below, describes the LSC coordinating training data collection for training localization prediction models. Once the LSC determines it has collected sufficient amount of training data, it can initiate localizations model training to obtain one or more trained localization models. The trained models may be distributed to the participating anchors, or trained models are maintained at the LSC.

After the localization models are trained, at step 530, the second stage of the operation, which is providing the localization service as well as maintaining the models, is activated. The maintenance operation in step 534 is conducted by the LSC, where it keeps collecting new training data measurements while providing the service. The data collection at this stage can be operated in a sporadic manner. The purpose of the data collection in this stage is to ensure the collected data reflect the current environment, that may change slowly over time.

Although FIG. 5 illustrates an example method, various changes may be made to FIG. 5. For example, while the method 500 is shown as a series of steps, various steps could overlap, occur in parallel, occur in a different order, or occur multiple times. In another example, steps may be omitted or replaced by other steps.

Figure 6:
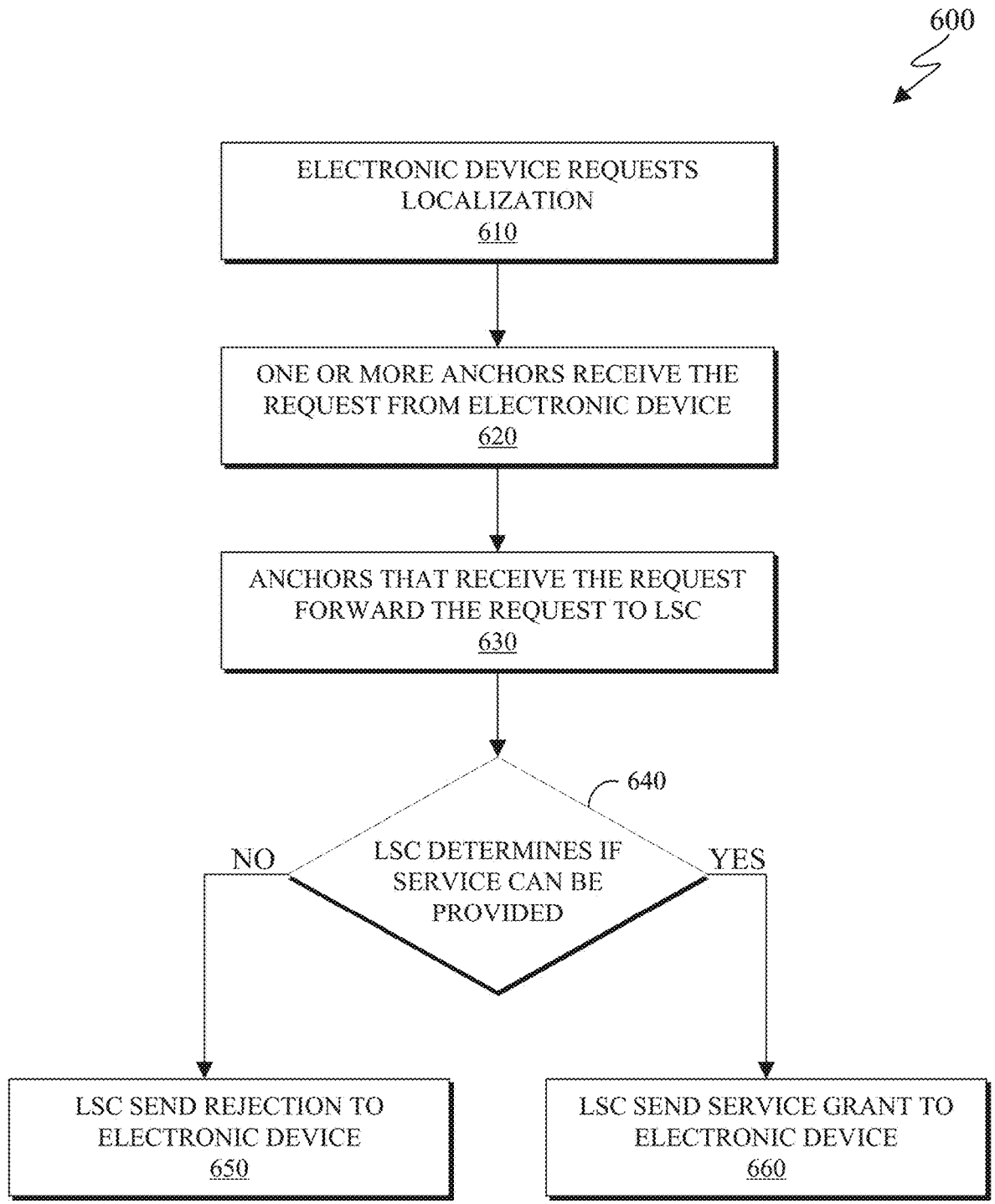
FIG. 6 illustrates an example method of a localization system coordinator (LSC) responding to a request for localization in accordance with an embodiment of this disclosure.
Figure 7A:
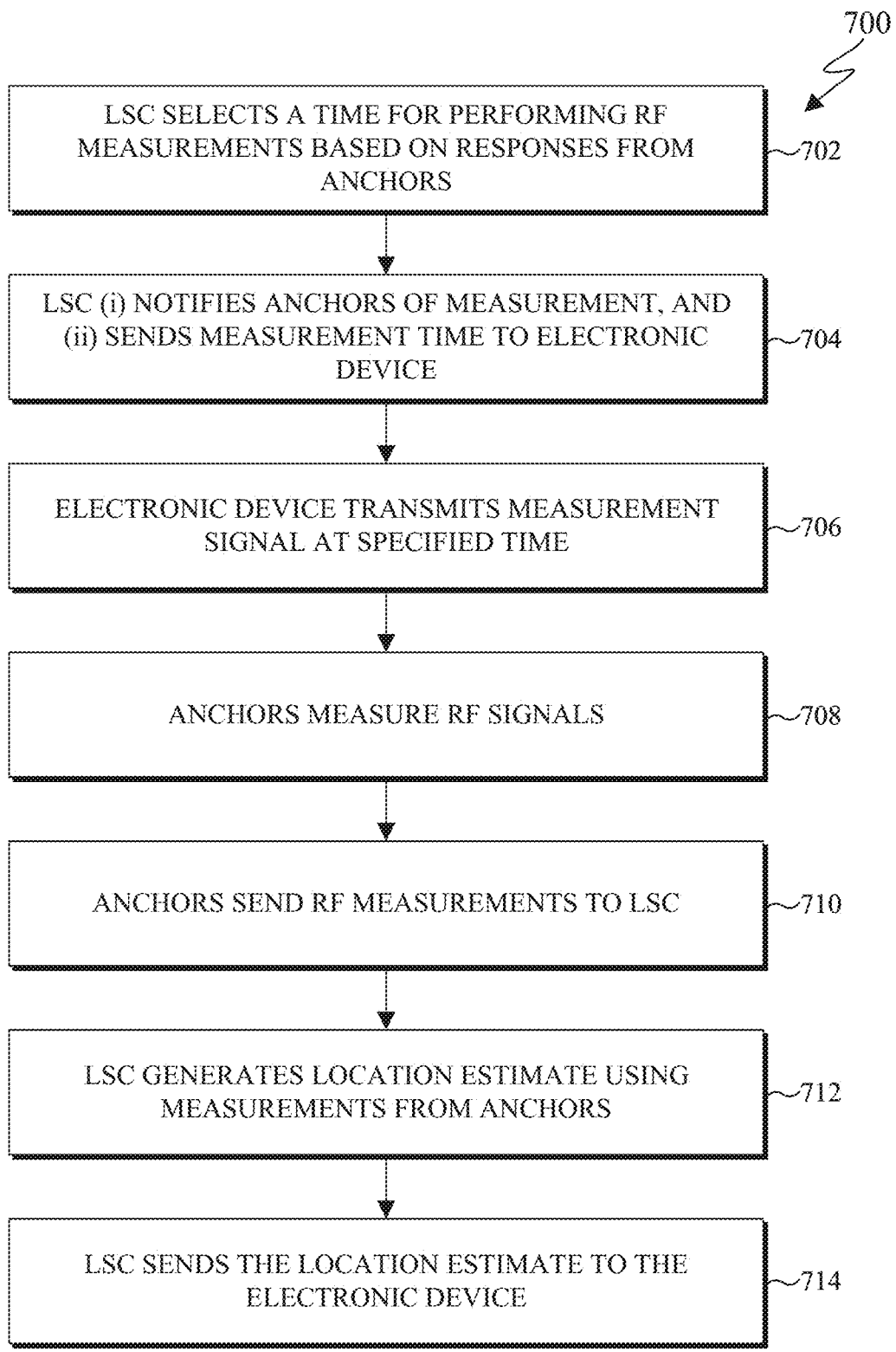
FIG. 7A illustrates an example method of a LSC determining a location of an electronic device in accordance with an embodiment of this disclosure.
Figure 7B:
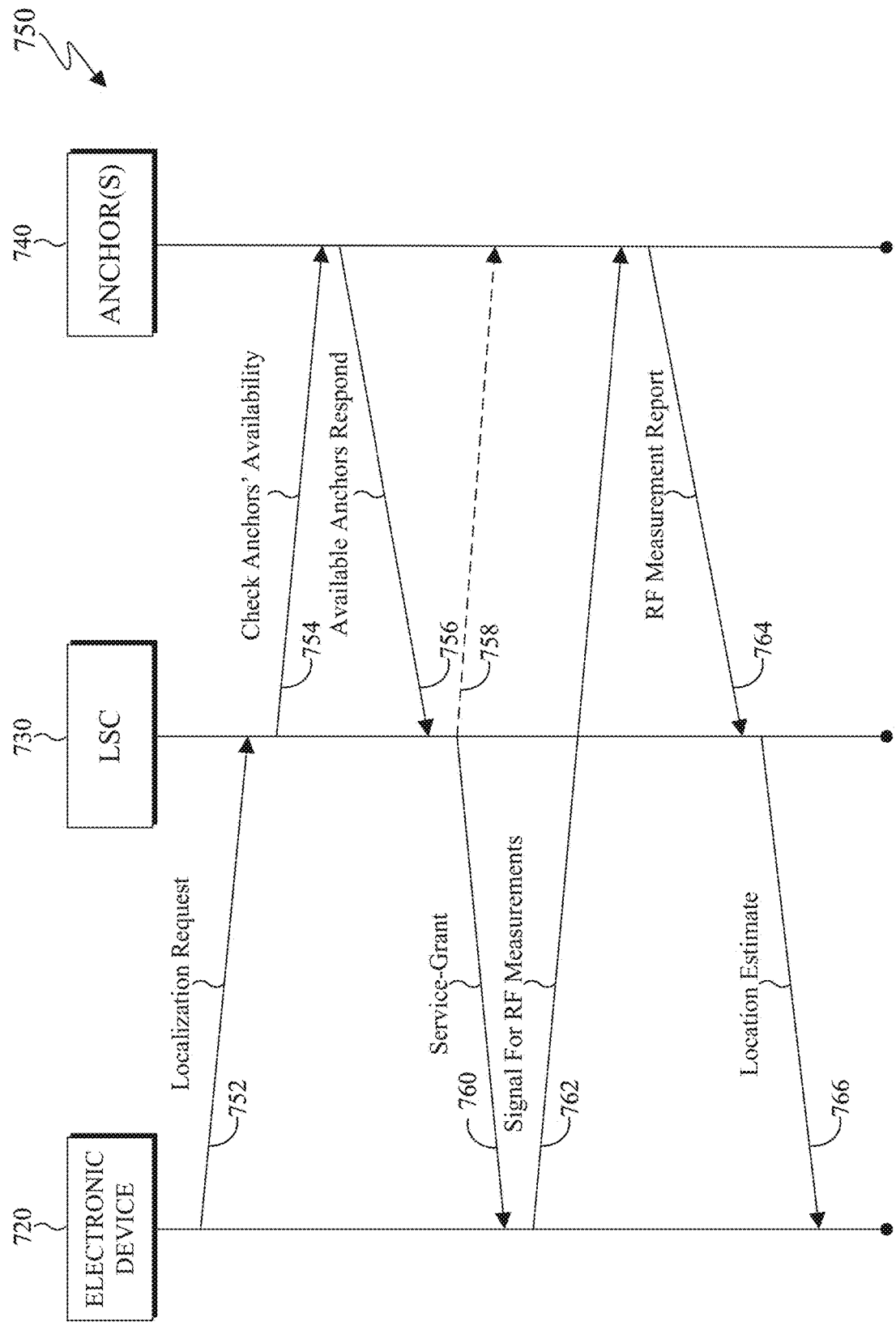
FIG. 7B illustrates a timing diagram for localizing an electronic device in accordance with an embodiment of this disclosure.
Figure 8:
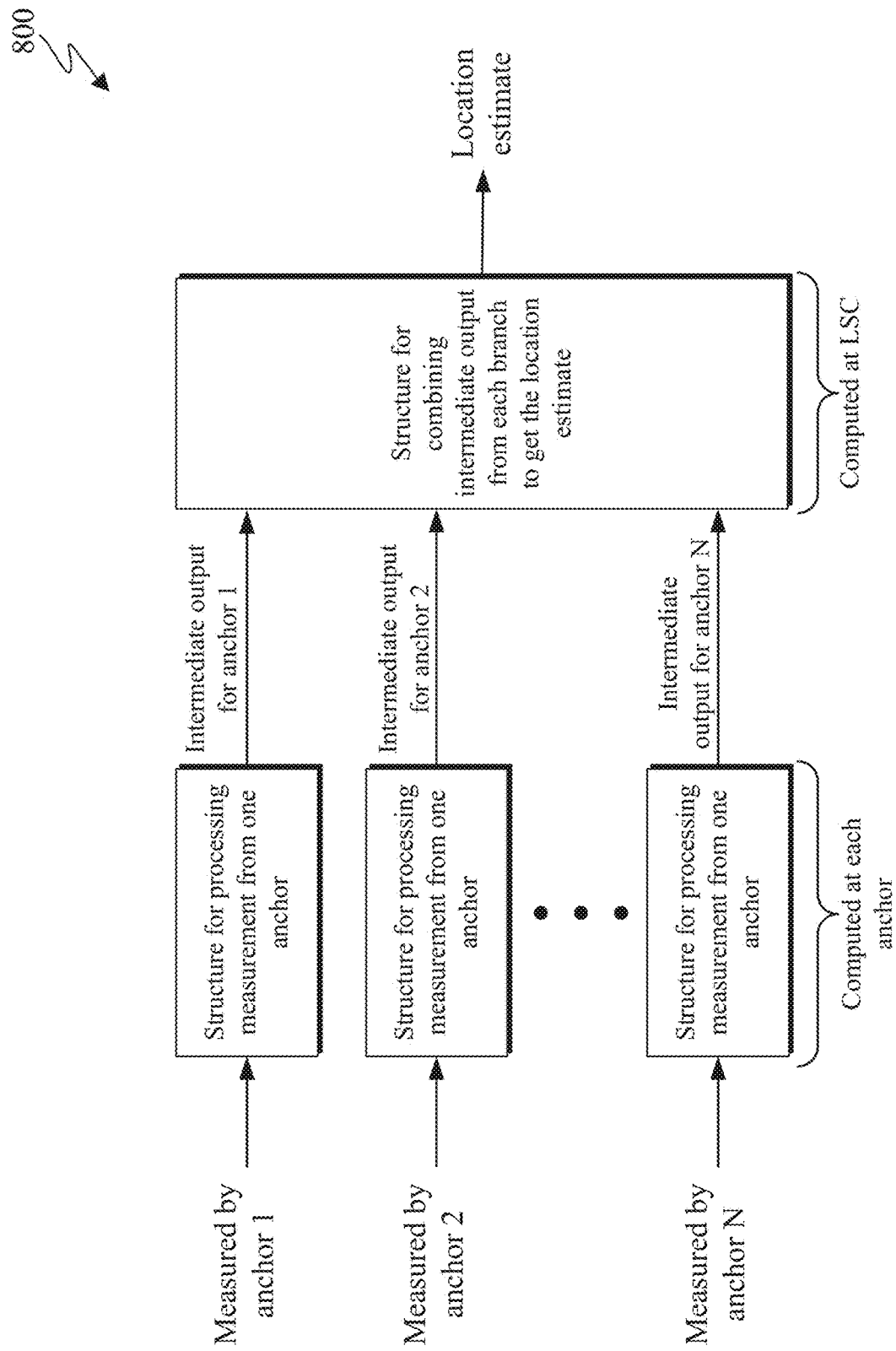
FIG. 8 illustrates a block diagram for partial distributed processing for localization in accordance with an embodiment of this disclosure.

FIG. 6 illustrates an example method 600 of a LSC responding to a request for localization in accordance with an embodiment of this disclosure. FIG. 7A illustrates an example method 700 of a LSC determining a location of an electronic device in accordance with an embodiment of this disclosure. FIG. 7B illustrates a timing diagram 750 for localizing an electronic device in accordance with an embodiment of this disclosure. FIG. 8 illustrates a block diagram 800 for partial distributed processing for localization in accordance with an embodiment of this disclosure.

The methods 600 and 700 are described as implemented by any one of the client device 106-116 of FIG. 1, the server 104 of FIG. 1, the access point 120 of FIG. 1, any of the access points 402, or any of the immobile devices 404 of FIG. 4 and can include internal components similar to that of electronic device 200 of FIG. 2 and the electronic device 301 of FIG. 3. However, the method 600 as shown in FIG. 6 method 700 as shown in FIG. 7A could be used with any other suitable electronic device and in any suitable system.

In order for an electronic device (such as one of the client devices 106-116 of FIG. 1) to be able to access the localization service, the electronic device should be aware that the service is available. The availability of the service can be announced in a control message for maintaining the network, provided in a request-response approach, or the like.

The announcement in a control message approach, can notify the electronic device that the network (or system) is capable of providing a localization service. For example, the beacon frames can be used in a Wi-Fi system. One of the reserved field in the network capability information could be used for this purpose. Since all devices have to receive beacons to be able to connect to the network, it would also know whether localization service is available by the time it is connected to the network.

A request-response approach can notify the electronic device that the environment is capable of providing a localization service. The LSC is responsible for responding to such an information request. If the network is an ad hoc network, the device would broadcast its information request, and if the request reaches the LSC or one of the participating anchors, they may respond back with the information. If the network is an infrastructure-based network, the LSC may register with the network (assuming the network supports localization service), and have the network respond to such information request. If an electronic device wants to localize itself, it first sends an information request to obtain the network's capability and checks whether localization service is available. The electronic device may record past responses and save an indication as to whether localization was available for the network. This way, the electronic device does not need to send such information request every time it wants to localize itself.

The method 600, describes a request-response approach for accessing the localization service. For example, an LSC, which could be one of the anchors, is responsible for responding to localization request from an electronic device (such as any of the client devices 106-116 of FIG. 1) as well as coordinating the anchors to provide the service. In step 610, the electronic device transmits a request for localization. In step 620, one or more of the anchors (such as any other client devices 106-116 of FIG. 1) receives the request from the electronic device. In certain embodiments, the network could be an ad hoc or an infrastructure-based network. For an ad hoc network, any nodes in the network could receive the request, and in an infrastructure-based network, only the APs may receive the request. Regardless of network type, in step 630, the anchor(s) that received the request from the electronic device forwards the request to the LSC.

In step 640, the LSC determines whether the service can be provided. There could be several factors in deciding whether a localization service can be provided. The LSC can check if the electronic device is authorized to use the service if such a policy is adopted. For example, the LSC can verify that the electronic device is authorized via a list of registered devices. Such authentication information could be distributed to the anchors by the LSC. That way, when an anchor receives a localization request, it can check the authentication. If authentication fails, the anchor may choose not to forward the request message to the LSC or the anchor may send a service-reject message (such as the message in step 650). In certain embodiments, any electronic device that is connected to the network are allowed to use the localization service, then such authentication is not needed at this stage.

The LSC can also determine whether to provide the localization service based on resource availability. The LSC can check how many anchors are available for providing the localization service. If the number of anchors is lower than some threshold, then localization performance may not be reliable. Therefore, the LSC determines that the localization service cannot be provided.

If the LSC determines that it is not possible to provide the localization service to the electronic device, the LSC, in step 650 would send a service-deny message to the electronic device. Alternatively, if the LSC determines that it is possible to provide the localization service to the electronic device, the LSC, in step 660 would send a service-grant message to the electronic device. Upon determining to grant the localization service, the LSC can then provide the localization service, as described in FIGS. 7A and 7B, below.

The response from the LSC (in steps 650 and 660) could be direct or indirect depending on whether the network allows a direct connection between the LSC and the electronic device. For example, in an ad hoc network, if the LSC can reach the user, it can transmit to the user directly. In an infrastructure-based network, if the LSC is an AP, it can transmit directly, but if it is not, it has to transmit it through an AP. If the localization request is not received by any anchors, there would be no response from an LSC. In that case, the electronic device could resend its request after some timeout period.

In certain embodiments, the LSC can transmit a soft response to the electronic device (not shown). For example, when at least some anchors are available rather than providing a binary response (grant or reject), the LSC may choose to send service grant but indicating that only localization with low accuracy is available, in order to let the electronic device determine whether to proceed with the localization service.

The method 700, as shown in FIG. 7A, describes the LSC determining the location of the electronic device within the environment. In certain embodiments, the method 700 is performed after step 660 of FIG. 6.

In step 702, the LSC selects a time for performing the RF measurements. The determination can be based on response from the anchors. For example, during the determination of the availability of the anchor(s), as described above, the LSC may obtain information on when those anchors could perform the RF measurements. The LSC could decide a measurement time based on the received information.

Once the LSC decides a measurement time, the LSC in step 704, notifies both the anchors and the electronic device of that time. This notification can be included in service-grant message of step 660. For example, the same message can be sent to the anchors and the electronic device. Alternatively, the notification to the anchors may use a different message than the service-grant message (of step 660) that is sent to the electronic device. In certain embodiments, the LSC assumes the anchors will keep scanning for reception during the time they indicate as available to the LSC, and as such does not send a designated message to the anchors (only the electronic device receives a message with the indicated time).

In step 706, the electronic device transmits signals for the measurement at the time specified by the LSC (such as in the service-grant message). In step 708, the anchors would receive and process those signals to some appropriate form. For example, if only the signal strength is used, the signal strength would be estimated; if the estimated channels are used, then the anchors would estimate the channel. In step 710, the anchors forward the measurements to the LSC. In step 712, the LSC would proceed to compute the location estimate using those reported measurements. in step 714, the LSC would send the location estimate to the electronic device.

The timing diagram 750 of FIG. 7B combines the methods 600 of FIG. 6 and the method 700 of FIG. 7. That is the timing diagram 750 describes a period of time from the localization request until receipt of the location estimate, based on a case when the localization service is available and the localization service can be successfully provided (there are enough anchors available for doing RF measurements, and those measurements were obtained without error).

The timing diagram 750 is based on communication between an electronic device 720, an LSC 730, and one or more anchors 740. The electronic device 720 can be any one of the client device 106-116 of FIG. 1 and can include internal components similar to that of electronic device 200 of FIG. 2 and the electronic device 301 of FIG. 3. The LSC 730 or any of the anchors 740 can be any one of the client device 106-116 of FIG. 1, the server 104 of FIG. 1, the access point 120 of FIG. 1, any of the access points 402, or any of the immobile devices 404 of FIG. 4 and can include internal components similar to that of electronic device 200 of FIG. 2 and the electronic device 301 of FIG. 3. However, the timing diagram 750 as shown in FIG. 7B could be used with any other suitable electronic device and in any suitable system.

The electronic device 720 transmits a localization request via message 752. The localization request can be similar to the localization request of step 610 of FIG. 6. After the LSC 730 receives the localization request (via message 752) the LSC 730 transmits a message 754 to the anchors 740. The message 754, is to check the availability of the anchors. In certain embodiments, the message 754 represents a single message that is received by any available anchor 740. In other embodiments, message 754 represents multiple messages. For example, when the message 754 represents multiple messages, the LSC 730 transmits individual messages to each of the anchors 740. The LSC 730 then receives one or more messages 756 from the anchors 740.

The LSC 730 transmits the message 758 to the anchors and the message 760 to the electronic device 720. The message 760, indicates that the LSC grants the request for localization. The message 760 includes a time that the electronic device 720 is to transmit the message 762 that includes a signal for RF measurements by the anchors 740.

The message 758, which the LSC 730 transmits to the anchors 740 represents one of several possibilities. In certain embodiments, the anchors 740 may just listen for the service grant or there could be separate messaging from the LSC 730 to notify the anchors of the scheduled timing for the RF measurements. In certain embodiments, there could be no messages at all for this scheduling info if the anchors 740 can be assumed to keep scanning the channel during the time they indicate they are available.

After the anchors 740 receive the message 762 from the electronic device 720, the anchors 740, transmit a message 764 to the LSC 730. The message 764 includes an RF measurement report that is transmitted by each of the anchors 740 that received the message 762 from the electronic device. The LSC 730 then identifies the location of the electronic device 720 based on (i) the received RF measurement reports included in the messages 764 and (ii) a previously generated localization model. The LSC then transmits a message 766 to the electronic device 720. The message 766 includes the location of the electronic device 720.

In certain embodiments, rather than sending the measurements to the LSC 730, each of the anchors 740 can process the RF measurements to some intermediate form. For example, the trained localization model can be divided into parallel structure that can take RF measurement from each anchor separately. The block diagram 800 of FIG. 8 shows an example of partial distributed processing for localization.

The block diagram 800 shows an example of a model that allows intermediate output calculation to depend only on the measurements from one anchor. This structure allows a partial distributed computation for inference where each of the anchors 740 may process the measurements to the intermediate output and helps reduce the computational burden on the LSC 730. In this case, each of the anchors 740 would compute the intermediate output using those parallel structure corresponding to its measurement. The anchors 740 then would report those intermediate outputs rather than reporting the RF measurement to the LSC 730. The LSC 730 would further process those intermediate outputs to get the final location estimate.

Although FIGS. 6, 7A, and 7B illustrates an example methods and timing diagrams, various changes may be made to FIGS. 6, 7A, and 7B. For example, while the methods 600 and 700 are shown as a series of steps, various steps could overlap, occur in parallel, occur in a different order, or occur multiple times. In another example, steps may be omitted or replaced by other steps.

Figure 9A:
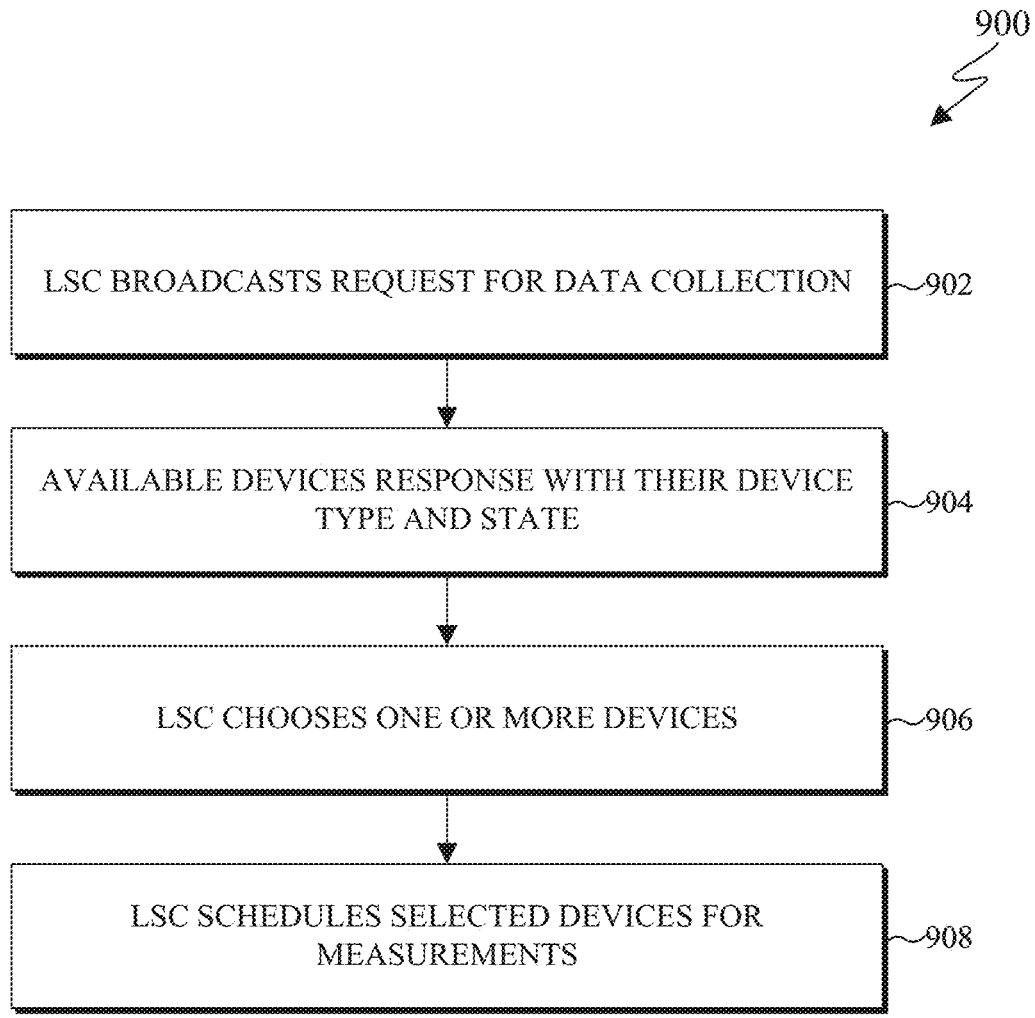
FIG. 9A illustrates an example method of an LSC coordinating data collection for generating a localization model in accordance with an embodiment of this disclosure.
Figure 9B:
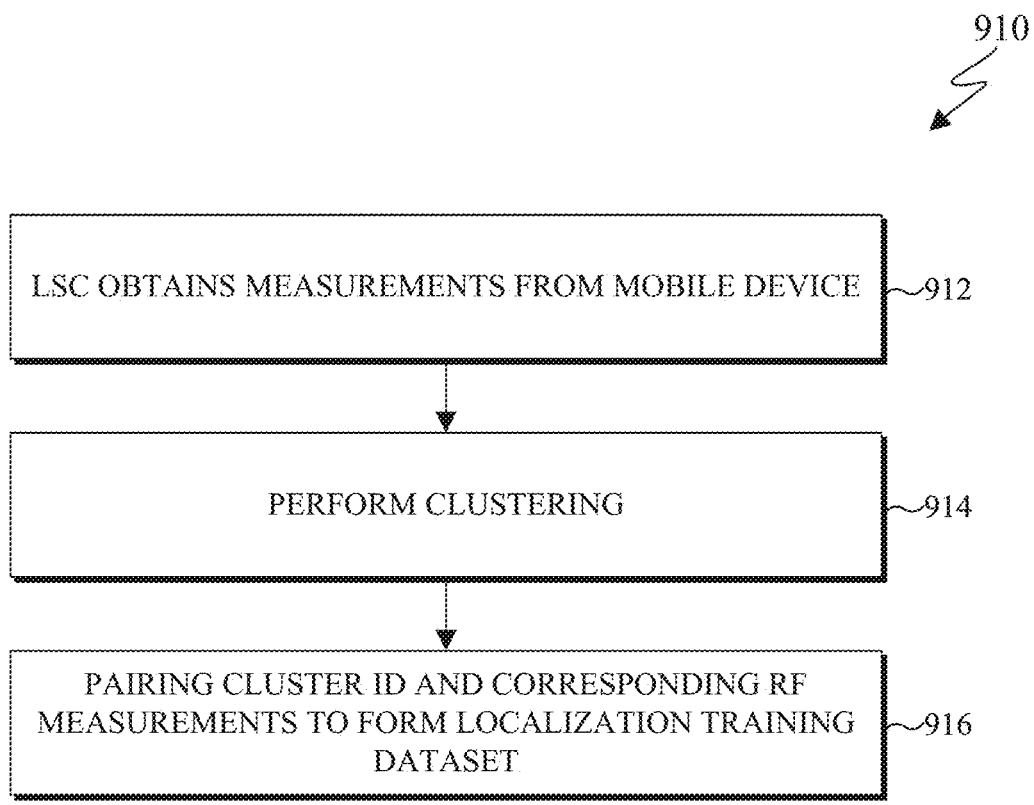
FIG. 9B illustrates an example method of associating localization data with implicit labels in accordance with an embodiment of this disclosure.

FIG. 9A illustrates an example method 900 of an LSC (such as the LSC 730) coordinating data collection for generating a localization model in accordance with an embodiment of this disclosure. FIG. 9B illustrates an example method 910 of associating localization data with implicit labels in accordance with an embodiment of this disclosure. The methods 900 and 910 are described as implemented by any one of the client device 106-116 of FIG. 1, the server 104 of FIG. 1, the access point 120 of FIG. 1, any of the access points 402, or any of the immobile devices 404 of FIG. 4 and can include internal components similar to that of electronic device 200 of FIG. 2 and the electronic device 301 of FIG. 3. However, the methods 900 and 910 as shown in FIGS. 9A and 9B could be used with any other suitable electronic device and in any suitable system.

The LSC 730, coordinates an automatic collection for training data in order to generate training localization prediction models. This process can include (i) obtaining training data with implicit labels and (ii) obtaining explicit labels. Implicit labels only allow the distinction between locations but the labels by themselves do not have any interpretable meaning. Examples of implicit labels can resemble P1, P2, P3, and the like. In contrast, explicit labels refer to labels with interpretable meanings such as coordinate or some descriptive names (such as living room, kitchen, particular names associated with bedrooms, and the like).

As shown in the method 900, the automatic data collection process is managed by the LSC 730. In step 902, the LSC 730 broadcasts a request for data collection. In step 904, the LSC 730 receives responses from any devices (these also include immobile devices that might also act as anchors) that are available and could cooperate for data collection. The response from each device can include an indication of its type and its current state. The device type allows the LSC 730 to differentiate mobile devices (such as the mobile device 108) versus immobile devices. The device state allows the LSC to determine the appropriateness for doing the measurements. A list of device types and their states may be similar to the list defined in the OCF device specification by the OCF. Among these positive responses, the LSC 730 may first check which devices could provide the measurements it needs. Then among those remaining devices, the LSC 730 determines their suitability for the measurement by checking against the device type and state (step 906). Once the LSC 730 completed the device selection, the LSC 730 would schedule those selected devices for the measurements (step 908). The LSC 730 would notify the devices on the scheduled measurements as well as coordinating the anchors to do the measurements at those time instants.

For the LSC 730 to determine which measurements to prioritize or to refresh depends on how the training dataset is managed. In certain embodiments, the localization system used an active learning algorithm that may determine what types of data might be more valuable to add to the training dataset.

In certain embodiments, the localization system balances between training dataset by keeping the relative measurements from various device types (such as the mobile devices and immobile devices) and/or labels to be in similar contribution ratios.

In certain embodiments, the localization system sets a goal to keep the most up-to-date training data. For example, if there is a big piece of furniture just brought to the house, it could affect the wireless propagation environment and degrade the localization performance. To account for such environmental variation in the house, the LSC 730 may prioritize to replace training data with old time-stamp while trying to keep a balanced contribution among the different device types or labels as described in the previous approach.

In certain embodiments, a weight function is defined that depends on the time stamp or time difference between the measurement time and the current time. For example, the weight function could be defined such that older samples have smaller weight values than newer samples. The weight function can help the LSC 730 determine which samples in the current training dataset should be replaced. The LSC 730 may then prioritize the data collection corresponding to those samples with small weights.

Additionally, the LSC 730 can prioritize to replace training data in response to an explicit request from the user.

During the maintenance stage of step 534 of FIG. 5 (such as when the initial localization capability is already enabled), the LSC 730 may request anchors (including itself) to do localization to check if any anchors have been moved. If an anchored is determined to be moved, then training data measured by that anchor are no longer valid. In this case, those training data samples are discarded. Alternatively, the LSC 730 can replace the measurements from that anchor with dummy values. In this situation, once the anchor is determined to be moved, the LSC 730 can increase the frequency to request training data that include that anchor so that the number of samples after being moved to the new location can be restored to a similar level before the displacement. Then, the localization model could be retrained with the new set of training data. This way, the degradation due to a displaced anchor can be mitigated (such as by excluding its data from previous location) and fixed in short duration (due to the action by the LSC 730 to focus on collecting data with this anchor).

Determining if a device is in a state that is suitable for data collection with implicit labels, is based on identifying states with the ability to infer that the electronic device is in some fixed location (although the location itself can be unknown). Here, 'location' is defined with some accuracy level, (such as meter-level accuracy). As discussed above, there are two categories of devices that are considered for data collection, immobile devices and mobile devices.

For data collection with immobile devices, the location of this category of devices are fixed, and thus RF measurements from immobile devices can be collected at any time as long as the device is available for measurement. While the locations of those immobile devices do not change over time, the wireless channel can be affected by the surrounding environment. Therefore, in certain embodiments, multiple samples from each immobile device is collected to account for the different environmental variations. The implicit labels in this case can be obtained directly from the address of those immobile devices. Immobile devices are devices that typically do not move much throughout a particular time period, such as a day, a week, a month, and the like. Example immobile devices include a desktop computer (similar to the desktop computer 106 of FIG. 1, a TV, appliances (such as an oven, a fridge, an air conditioning unit), and the like.

For data collection with mobile devices, location of this category of devices is not fixed, however certain situations can indicate whether the location is fixed for a period of time. In certain embodiments, the LSC 730 can determine that an electronic device is mobile based on the device type indicated in the step 904. The LSC 730 can then determine whether the electronic device can be considered stationary based on the indicated state of the device.

For example, one such situation is when the mobile device is charged via a cable to some electrical outlet or some immobile devices (such as the desktop computer 106 of FIG. 1), and the charging activity can be detected by the mobile device. Since the cable length is limited, it can be inferred that the location of the device is the location of the outlet with the accuracy of the location based on the cable length.

For another example, the device mobility status can also be used to determine the appropriateness for the data collection. Device mobility can be determined from sensors such as Inertial Measurement Unit (IMU) sensors, gyroscope sensors, accelerometer sensors and the like. In this case, the device can be deemed to be appropriate for data collection, when the device remains static for some duration. For instance, the user of the mobile device could place the mobile device on a piece of furniture within the environment (such as a table, a desk, a nightstand, and the like). The user could repeat these placements of the mobile device on the furniture during certain time period on the furniture and thus allow the data collections from these commonly used locations.

The method 910 of FIG. 9B describes associating localization data with implicit labels. It is noted that the automatic data collection described thus far does not include any labels. Therefore, to include implicit labels with the automatic data collection, in step 912, the LSC 730 obtains measurements from the mobile devices. in step 914, the LSC 730 clusters the obtained data. For example, the LSC 730 can apply an unsupervised learning method to cluster the data collected to obtain implicit labels (that can be thought of as corresponding to outlet locations in this case). It is noted that by limiting to fixed but unknown locations as described here, it is possible to collect multiple samples from those locations. The variation comes from the precision of the location (limited by the cable length) as well as the changes in the surrounding environment. When measurements from the mobile device is collected without any restriction, it is not possible to ensure the collection of multiple samples from the same location, which can create difficulty for clustering the data. In step 916, the LSC 730 pairs the cluster ID (the implicit label) with the corresponding RF measurements to generate the localization training dataset.

Although FIGS. 9A and 9B illustrates example methods, various changes may be made to FIGS. 9A and 9B. For example, while the methods 900 and 910 are shown as a series of steps, various steps could overlap, occur in parallel, occur in a different order, or occur multiple times. In another example, steps may be omitted or replaced by other steps.

Depending on applications, implicit labels alone could be enough for the localization. For example, if the location information is used to help enable some location specific services, then there is no need to know absolute locations. In such a case, the user's usage history can be recorded with the implicit location (implicit labels), and the service operation can be customized for each implicit label according to the historical data.

Figure 10A:
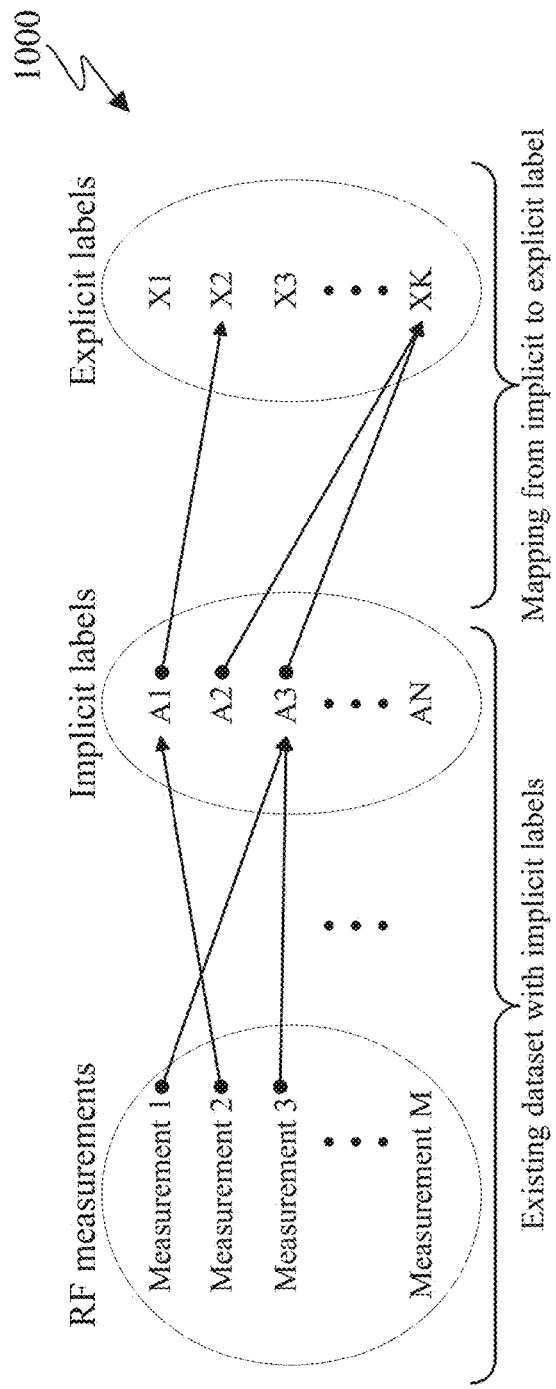
FIGS. 10A and 10B illustrate example diagrams for mapping implicit labels to explicit labels in accordance with an embodiment of this disclosure.
Figure 10B:
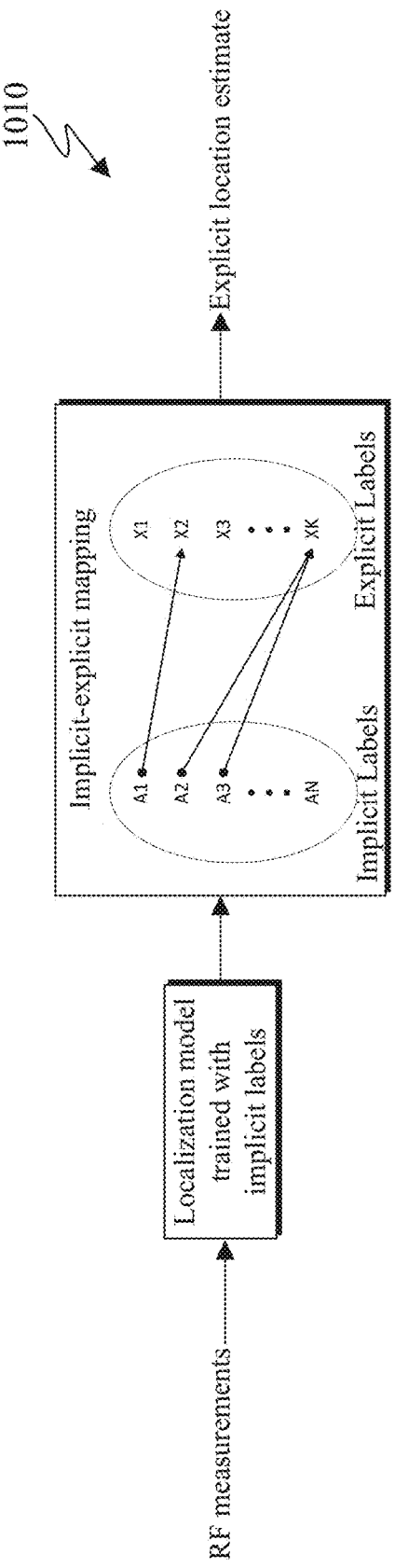

In certain embodiments, absolute location is needed. For example, in some applications, the service customization is not based on historical data but based on some specific use cases. For an in-house use case, it could be to differentiate between the operation in a living room versus operation in a bedroom. FIGS. 10A and 10B illustrate example diagrams 1000 and 1010 for mapping implicit labels to explicit labels in accordance with an embodiment of this disclosure.

To broaden the range of location-based applications, explicit labels may also be obtained. Instead of re-collecting training data with explicit labels; the LSC 730 associates existing training data with implicit labels or even the already trained model using implicit labels.

The diagram 1000 of FIG. 10A describes the LSC 730 associates existing training data with implicit labels. As illustrated in the diagram 1000, the mapping between implicit and explicit label is used to generate a new training dataset with explicit labels. Since the number of distinct labels could be different, retraining of the model may be needed.

As shown in the diagram 1000, first the explicit labels are obtained for the various implicit labels. Then, the implicit labels are replaced by the explicit labels to obtain a new training dataset with explicit labels. Note that it is not necessary that the number of implicit labels be the same as the number of explicit labels. The granularity of the explicit labels could be coarser, such as at the room level, while the implicit labels might be collected at meter levels accuracy (multiple locations in the room where there are electrical outlets and where the immobile devices are). Therefore, the retrained model with explicit labels could be different due to the different number of distinct labels.

The diagram 1010 of FIG. 10 B describes the LSC 730 performing an implicit to explicit label mapping on top of the already trained models. The mapping could be application-dependent, so that each application that uses the localization service could interpret the implicit location estimate according to its needs.

As shown in the diagram 1010, the LSC 730 uses the explicit-to-implicit mapping on the output of the model trained with the implicit labels. Accordingly, there is no additional computation load to retrain the model. Also, one trained model (with implicit labels) could be reused for multiple implicit-to-explicit label mappings that could depend on the applications.

Figure 11A:
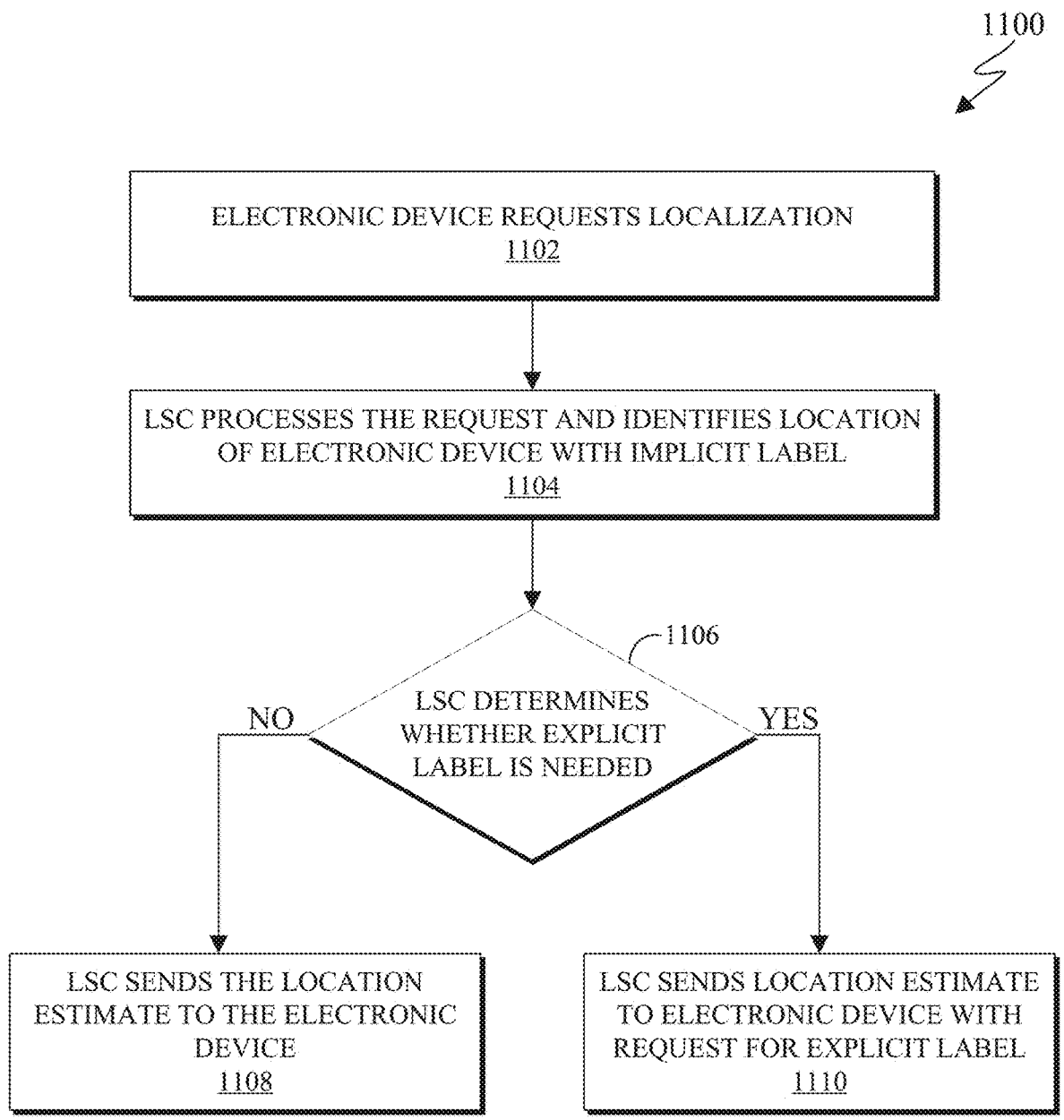
FIG. 11A illustrates an example method for requesting explicit labels from a user in accordance with an embodiment of this disclosure.
Figure 11B:
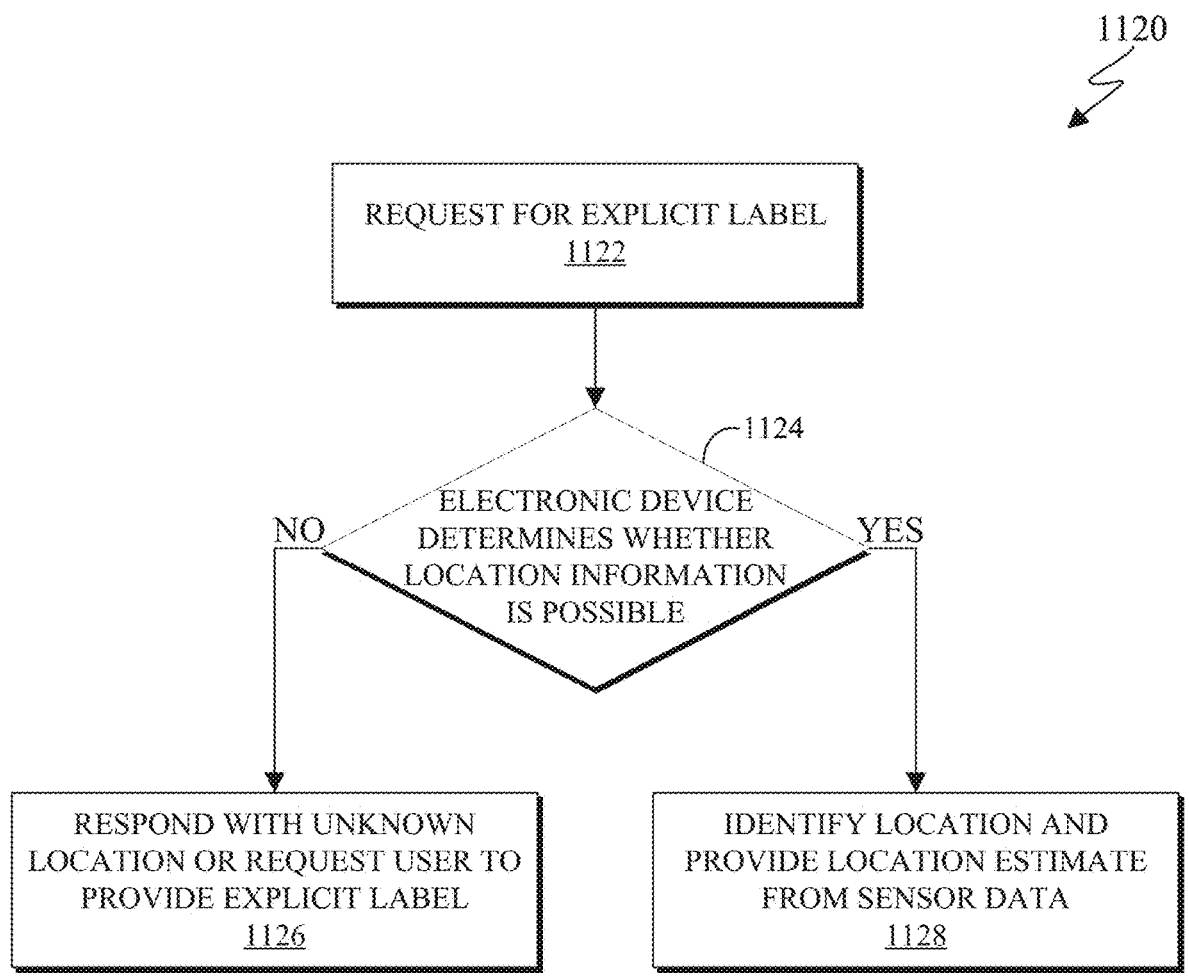
FIG. 11B illustrates an example method for determining explicit location based on sensor data in accordance with an embodiment of this disclosure.

FIG. 11A illustrates an example method 1100 for requesting explicit labels from a user in accordance with an embodiment of this disclosure. FIG. 11B illustrates an example method 1120 for determining explicit location based on sensor data in accordance with an embodiment of this disclosure. The methods 1100 and 1120 are described as implemented by any one of the client device 106-116 of FIG. 1, the server 104 of FIG. 1, the access point 120 of FIG. 1, any of the access points 402, or any of the immobile devices 404 of FIG. 4 and can include internal components similar to that of electronic device 200 of FIG. 2 and the electronic device 301 of FIG. 3. However, the methods 1100 and 1120 as shown in FIGS. 11A and 11B could be used with any other suitable electronic device and in any suitable system.

In certain embodiments, an interface is included on an electronic device for requesting the explicit label from the human user. For example, the LSC 730 can ask the human user for a description associated with each implicit label. The interface could provide the user with a list of standardized location labels such as living room, kitchen, bedroom, entertainment room, and the like. Another option is to allow the human user to provide their own labels. Such customized labels could be helpful when the labels are intended to be used by the human user (such as by a device finding application). This is because the explicit labels provided by a user can provide a better context of the location to the human user. For instance, with a label such as John's bedroom would be easier to understand than a standardized label such as bedroom 2.

For the procedure to request the explicit labels from the human user, it would depend on whether the explicit label mapping is maintained at the user's device or at the LSC. In cases where some context information on the location (e.g., whether it is a living room or a bedroom) is to be used, it might be beneficial to maintain such a mapping at the LSC side. It is noted that a more specific customization such as where different applications may use different implicit-to-explicit mapping (as described in FIG. 10B, above) could be beneficial. As such, the mapping (or mappings) might need to be maintained at the user's device side.

The method 1100 of FIG. 11A describes storing the explicit mapping at the LSC 730. If the explicit mapping is maintained at the LSC 730, the LSC 730 would need to request the electronic device 720 (which requested the localization service) to provide the explicit label. In step 1102, the LSC 730 receives a request for localization from the electronic device 720. The request for localization can be similar to the request of step 610 of FIG. 6 or the message 752 of FIG. 7B.

In step 1104, the LSC 730 processes the request by following the procedure as described above and identifies a localization estimate with implicit labels. In step 1106, the LSC 730 determines whether an explicit label is needed. If an explicit label is not needed, then the LSC 730, in step 1108, transmits the location estimate to the electronic device 720.

If an explicit label is needed, then the LSC 730, in step 1110 sends the location estimate (with implicit label) to the electronic device 720 along with a request for an explicit label for that location. To determine if an explicit label is needed, the LSC 730 firsts checks the map it has constructed so far to determine whether the implicit location of the electronic device is mapped to an explicit label. If the location estimate corresponds to a not-yet-mapped implicit label, then the LSC 730 requests the explicit label from the user of the electronic device 720. The user may or may not respond to the LSC 730 with the explicit label. If the user responds with the explicit label, the LSC 730 incorporates the explicit label into its mapping. This process continues until all the implicit labels are mapped to explicit labels.

Similar to the implicit training data collection, the LSC can keep refreshing the mapping by asking for feedback with a certain periodicity in order to maintain a correct implicit to explicit mapping. For example, if a room changes from John's bedroom to Sally's bedroom, by periodically requesting the feedback the LSC 730 can update the name of the implicit label.

By storing the mapping from implicit to explicit labels on the LSC is beneficial for when the mapping is used by multiple devices. For example, if the explicit label is input by one user, a user on a separate electronic device can obtain the same explicit label without the need to provide the explicit label to the LSC 730. Additionally since not all electronic devices have a means to provide an explicit label upon request, by maintaining the mapping between implicit to explicit labels on the LSC 730, the localization service can provide an explicit label to a device that would otherwise not have the ability to provide the explicit label to the LSC 730.

In certain embodiments, multiple implicit-to-explicit mapping can be maintained in the memory of the LSC 730. For example, the LSC 730 can maintain multiple mappings that are tailored to different application classes. In that case, a set of standardized mapping classes may be defined, and the LSC may include the mapping class in the message when requesting explicit labels from the user.

When the LSC 730 stores one or more implicit-to-explicit mappings, it can advertise that capability in a similar manner as advertising the localization service availability as described earlier. Another option is that the LSC may just advertise the localization service availability, and the user may indicate what localization service type it wants (such as implicit or explicit location label). Then, the service grant from the LSC could indicate whether the requested localization type can be fulfilled.

In the case that the implicit-to-explicit mapping is maintained at the electronic device 720, it may build up the mapping in a similar manner as at the LSC 730 side. When the electronic device 720 receives a new implicit location estimate (from the LSC 730), the electronic device 720 may check whether that implicit label is already mapped. If not, the electronic device 720 may request the human user to provide an explicit label and use the feedback to create a new entry in the mapping. An advantage for maintaining explicit labels as the electronic device 720 side is that it provides another layer of privacy. The LSC only knows the implicit location labels, while the electronic device 720 can map the implicit location to explicit labels, where the location can be understood and interpreted.

With advanced sensors, in some situations, it could be possible to obtain explicit labels automatically (instead of requesting a manual input from a user for providing the explicit label). In this case, as shown in FIG. 11B, when receiving a request for explicit labels (step 1122), the electronic device 720 can try to obtain the sensor data and try to make a determination whether explicit location label can be estimated from the sensor data. If it is possible, in step 1128 the electronic device 720 would estimate the location label using the sensor data and report back with that location estimate as the requested explicit label. If it is determined that it is not possible, then in step 1126, the electronic device 720 reports that unknown explicit label (or any form to signify that explicit label is not available) and flag that the request for explicit label cannot be fulfilled. The electronic device 720 may also opt to request explicit label from the human user.

One example of such sensor-based location determination maybe the room type determination (such as living room vs kitchen). For instance, in this case whenever the electronic device 720 is requested for an explicit label, it may use its camera to take a photo of the room. The photo may then be input to a machine learning model that determines the room type from the image. The output room type may then be the explicit label. Depending on how the device is being used, taking a picture might not always be possible. For example, if the device is in a low lighting environment or when the device's camera is being blocked, then the photo might be unsuitable for estimating the room type. In such a case, the device may respond back with a message indicting that explicit label is not available, or it may request the human user for the input.

Although FIGS. 11A and 11B illustrates example methods, various changes may be made to FIGS. 11A and 11B. For example, while the methods 1100 and 1120 are shown as a series of steps, various steps could overlap, occur in parallel, occur in a different order, or occur multiple times. In another example, steps may be omitted or replaced by other steps.

As described above, the localization model(s) are generated and stored on the LSC 730. As such, the LSC 730 is responsible for identifying the location estimates of the electronic device 720. For the LSC 730 to provide the localization of the electronic device 720, the electronic device 720 transmits a request for localization to the LSC 730. However, the electronic device 720 can perform passive localization without requesting localization from the LSC 730. For example, if the LSC 730 generates the localization model(s) and then transmits the localization model(s) to the electronic device 720, enables the electronic device 720 to perform the localization without requesting localization from the LSC 730. The electronic device 720 can request and download the localization model(s) from the LSC 730 once (or whenever the LSC 730 updates the localization model(s)). In the passive mode localization, the electronic device 720 passively scans the channels to try to measure the RF signals transmitted from the various anchors. Once it has enough measurements, it may compute the location estimate locally.

Similarly, the electronic device 720 can still request to perform active localization from the LSC 730 (such as described in step 610 of FIG. 6). In this case, the electronic device 720 may transmit and the anchors perform the RF measurements, which are collected by the LSC 730. The LSC 730 then sends the collected measurements to the electronic device 720 for the electronic device 720 to perform the localization.

Figure 12:
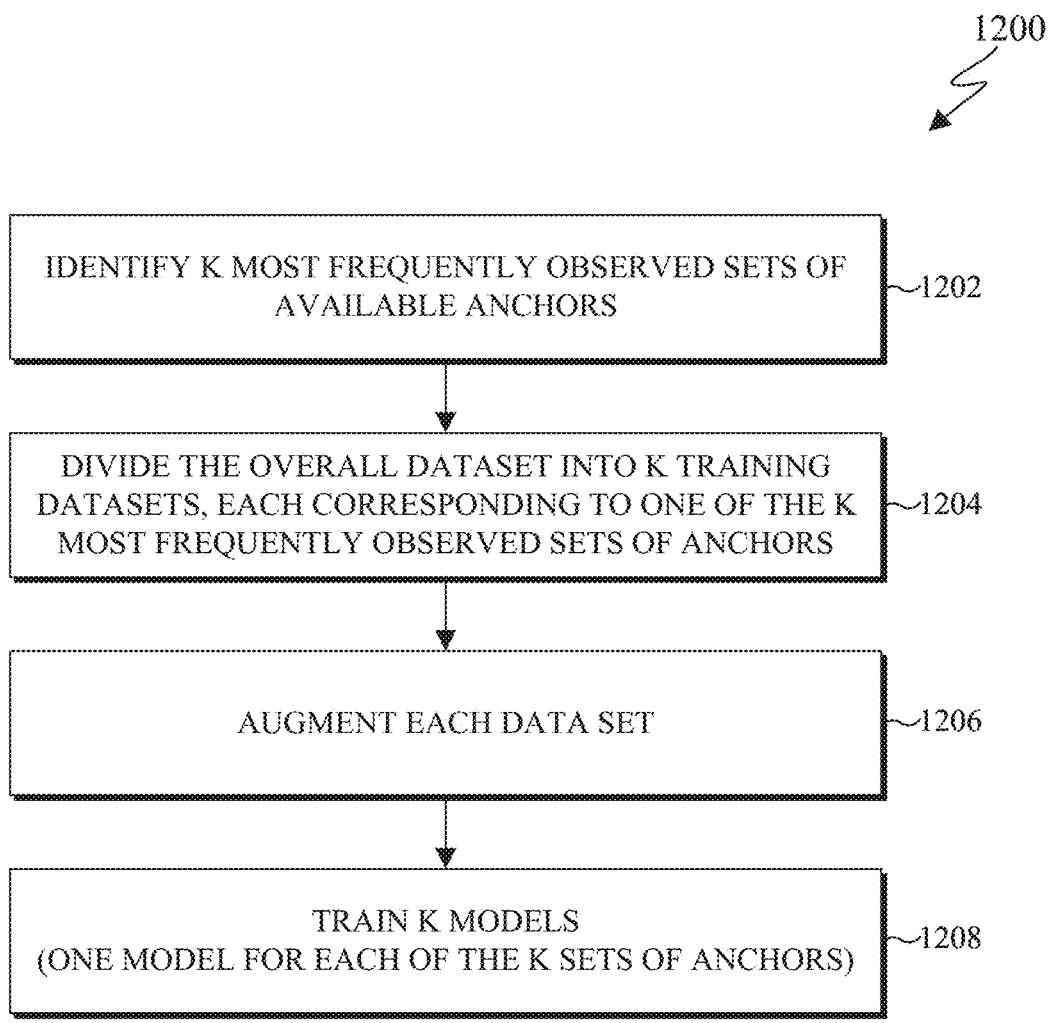
FIG. 12 illustrates an example method for generating multiple localization models in accordance with an embodiment of this disclosure.

FIG. 12 illustrates an example method 1200 for generating multiple localization models in accordance with an embodiment of this disclosure. The method 1200 is described as implemented by any one of the client device 106-116 of FIG. 1, the server 104 of FIG. 1, the access point 120 of FIG. 1, any of the access points 402, or any of the immobile devices 404 of FIG. 4 and can include internal components similar to that of electronic device 200 of FIG. 2 and the electronic device 301 of FIG. 3. However, the method 1200 as shown in FIG. 12 could be used with any other suitable electronic device and in any suitable system.

After the LSC 730 collected the training data, there are several configurations that the LSC 730 can use to train the localization models depending on the intended operation of the localization service. It is noted that since the data collection depends on the availability of the anchors, there is no guarantee that each collected training sample has measurements from all the anchors. At any given time, only a subset of the anchors may be available to support the data collection based on a request for localization. Several factors can limit the availability of the anchors. One is the coverage of the anchors. For example, in a large environment (such as a big house), an anchor in one corner of the house might have poor propagation channel to the other corner of the house. Therefore, if the mobile device happens to be in such a far corner, likely that anchor cannot measure the RF signals, even if the anchor is available. Another factor is the temporal variation of the resources of the anchors. For instance, depending on the device types, there could be certain times of the day where the anchors are likely more available than other times.

In certain embodiments, the LSC 730 can account for the variation in the number of available anchors 740 for localizing the electronic device 720. For example, the LSC 730 can account for the variation of the number of anchors in two ways. First, the LSC 730 can train one model that assumes one fixed input dimension (assuming all anchors' measurements are available). In this case, to account for the variations in the set of available anchors, the LSC 730 replaces those missing anchors during the training with dummy data. This is a form of data augmentation. The benefit of this approach is that there is only one model to maintain. However, depending on how large a typical set of available anchors is, the performance might not be very good. For example, when a typical set of available anchors is small compared to all the anchors in the localization system, most of the input becomes dummy input, which makes it hard to achieve good performance. However, in some cases (such as the unavailability due to coverage), the set of unavailable anchors maybe permanent for some part of the coverage area of the localization service. For such a permanent situation, it may be better to train multiple separate models depending on the set of available anchors.

The method 1200 of FIG. 12 describes another approach to deal with unavailable anchors. The method 1200 describes the LSC 730 training multiple models corresponding to different sets of anchors 740. Regardless of whether the availability of anchors depends on coverage or time, there can be a pattern of when certain anchors are available. As described earlier, the set of available anchors could depend on the coverage, or it could depend on time. In either case, the set of available anchors would have some identifiable patterns. Therefore, our disclosed solution is to train multiple models for the most commonly observed set of available anchors to squeeze out as much performance as possible.

As illustrated in FIG. 12. from the overall training data, the LSC 730 identifies K most frequently observed sets of available anchors (step 1202). It is noted that K is the target number of models. In certain embodiments, K is constrained so as not to be too large (for ease of operation for providing the service and maintenance). In step 1204, a training dataset is extracted from the overall dataset corresponding to each of the K sets of available anchors. This extraction may not a one-to-one mapping. It could happen that one training sample from the overall dataset might have a set of anchors that is a superset of multiple of the K sets. In that case, that sample can be down sampled to get a sample for each of those multiple sets. Each of the K sets is frequently observed but not always, and thus the trained model needs to handle when not all of the anchors in the set are available. Therefore, training samples in the overall dataset that contains a subset of the target set of anchors should also be included. In step 1206, the data for each of the K sets are augmented and prepared for training. For example, it may be convenient to have the same input dimension. Thus, similarly as in the case of one model only, the input size can be fixed and such that the measurements of the missing anchors can be replaced by some dummy data. One main purpose for the augmentation is also to deal with this problem of handling the case when not all anchors in the target set are available. If the training data is already rich enough, this augmentation can be omitted. If not, some anchors could be dropped (randomly or following frequently observed patterns in the overall dataset) and their measurements may be replaced with dummy data. In step 1208, the LSC 730 trains one model for each of the K datasets.

Although FIG. 12 illustrates an example method, various changes may be made to FIG. 12. For example, while the method 1200 is shown as a series of steps, various steps could overlap, occur in parallel, occur in a different order, or occur multiple times. In another example, steps may be omitted or replaced by other steps.

Figure 13:
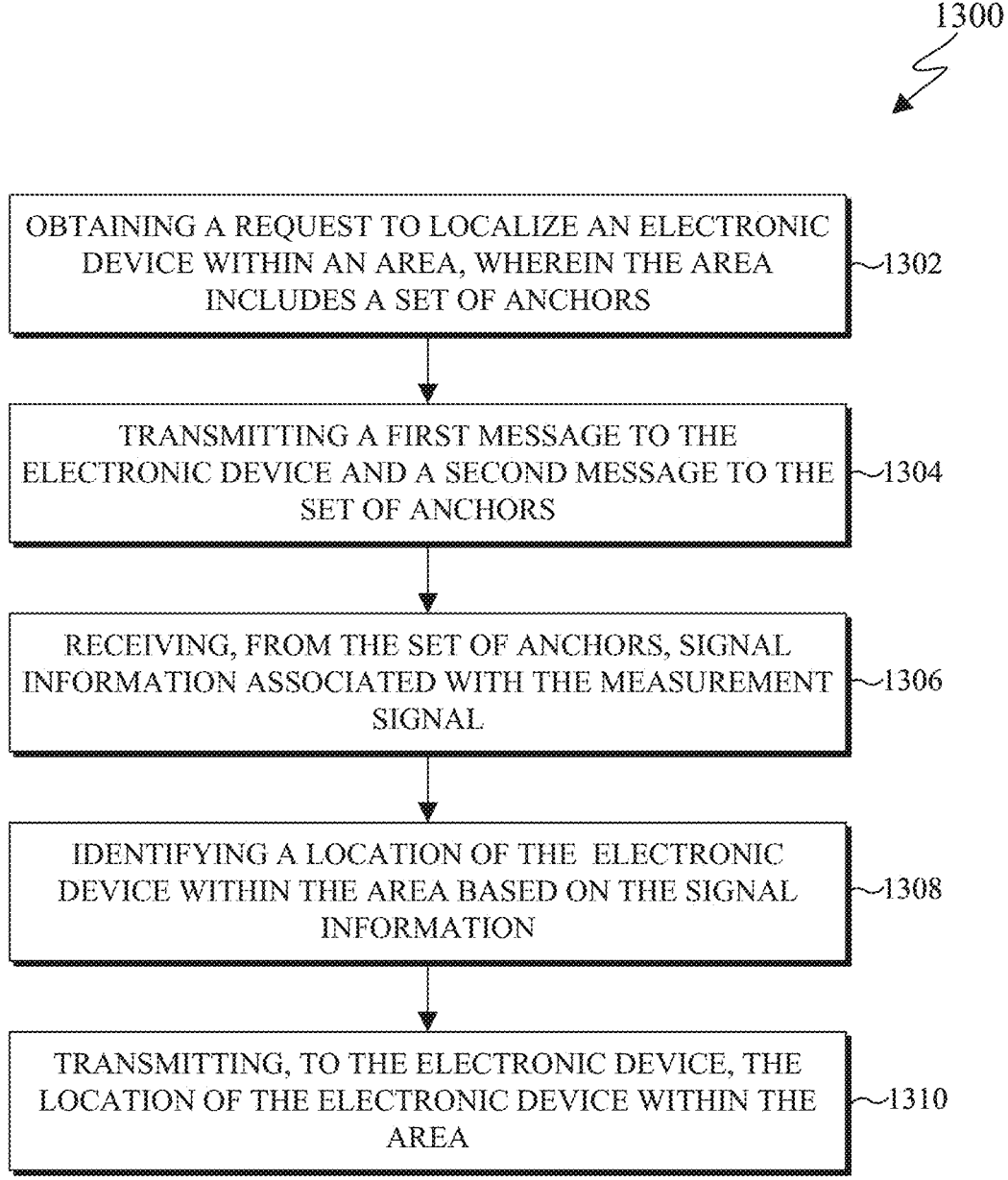
FIG. 13 illustrates an example method for localization by the LSC in accordance with an embodiment of this disclosure.

FIG. 13 illustrates an example method 1300 for localization by the LSC 730 in accordance with an embodiment of this disclosure. The method 1300 is described as implemented by any one of the client device 106-116 of FIG. 1, the server 104 of FIG. 1, the access point 120 of FIG. 1, any of the access points 402, any of the immobile devices 404 of FIG. 4, or the LSC 730 of FIG. 7B and can include internal components similar to that of electronic device 200 of FIG. 2 and the electronic device 301 of FIG. 3. However, the method 1300 as shown in FIG. 13 could be used with any other suitable electronic device and in any suitable system.

In step 1302, the LSC (such as the LSC 730 of FIG. 7B) obtains a request from an electronic device (such as the electronic device 720 of FIG. 7B). The request is for localizing the electric device within a given area. The request can be obtained from the electronic device itself or an anchor that received the request from the electronic device and forwarded the request to the LSC. The area includes one or more anchors.

In certain embodiments, the LSC obtains messages from other electronic devices within the area. based on the device type of the other electronic devices the LSC can determine whether the device is an immobile device. Upon determining that the electronic device is an immobile device the LSC can register that device as one of the anchors that are located throughout the environment.

In step 1304, the LSC transmits a first message to the electronic device (that transmitted the request for localization) and a second message to the one or more anchors within the area. The message that is transmitted to the electronic device includes a time that the electronic device is to transmit a signal. The message that is transmitted to the anchors includes a time that the anchors are to receive the signal from the electronic device. The time included in the message to the electronic device and the time that is included in the message to the anchors can be the same time. The LSC can determine the time based on an indication, from the anchors, that the anchors are available for localization.

In step 1306, the LSC receives signal information from the anchors. The signal information is based on the signal that the electronic device transmitted, and the anchors received. In step 1308, the LSC determines the location of the electronic device based on the received signal information from the anchors. For example, the LSC compares the signal information from the multiple anchors to a localization map (model), which was previously generated by the LSC, to determine the location of the electronic device relative to the various anchors.

To generate the localization map, the LSC obtains messages from other electronic devices. Each message that is received can include a state (or status) of the other electronic device and device type. In response to the LSC determining that the other electronic device is an immobile device, the LSC can receive measurements from that device. In response to the LSC determining that the other electronic device is a mobile device, the LSC determines whether the device state or status matches some predefined criteria. The predefined criteria could specify that the other electronic device is charging or stationary. Upon determining that the other electronic device satisfies the predefined criteria, the LSC can receive measurement information from the other electronic device. The LSC then generates the localization map based on the information from the other electronic devices which are either immobile devices or mobile devices that satisfies the predefined criteria.

In certain embodiments, the LSC can generate multiple localization models based on receiving signals from different sets of anchors. For example, when the LSC receives signal information from a portion of anchors (as compared to all of the anchors in step 1306), the LSC can select a localization model that was generated based on the same anchors that transmitted the signal information.

In certain embodiments, the localization model can include implicit labels based on measurements received from the anchors. To include the implicit labels in the localization model, the LSC can cluster measurements from one of more of the anchors. In certain embodiments, the localization model can also include explicit labels.

In step 1310, the LSC transmits the location estimate, based on the localization model and the signals received from the anchors to the electronic device.

Figure 14:
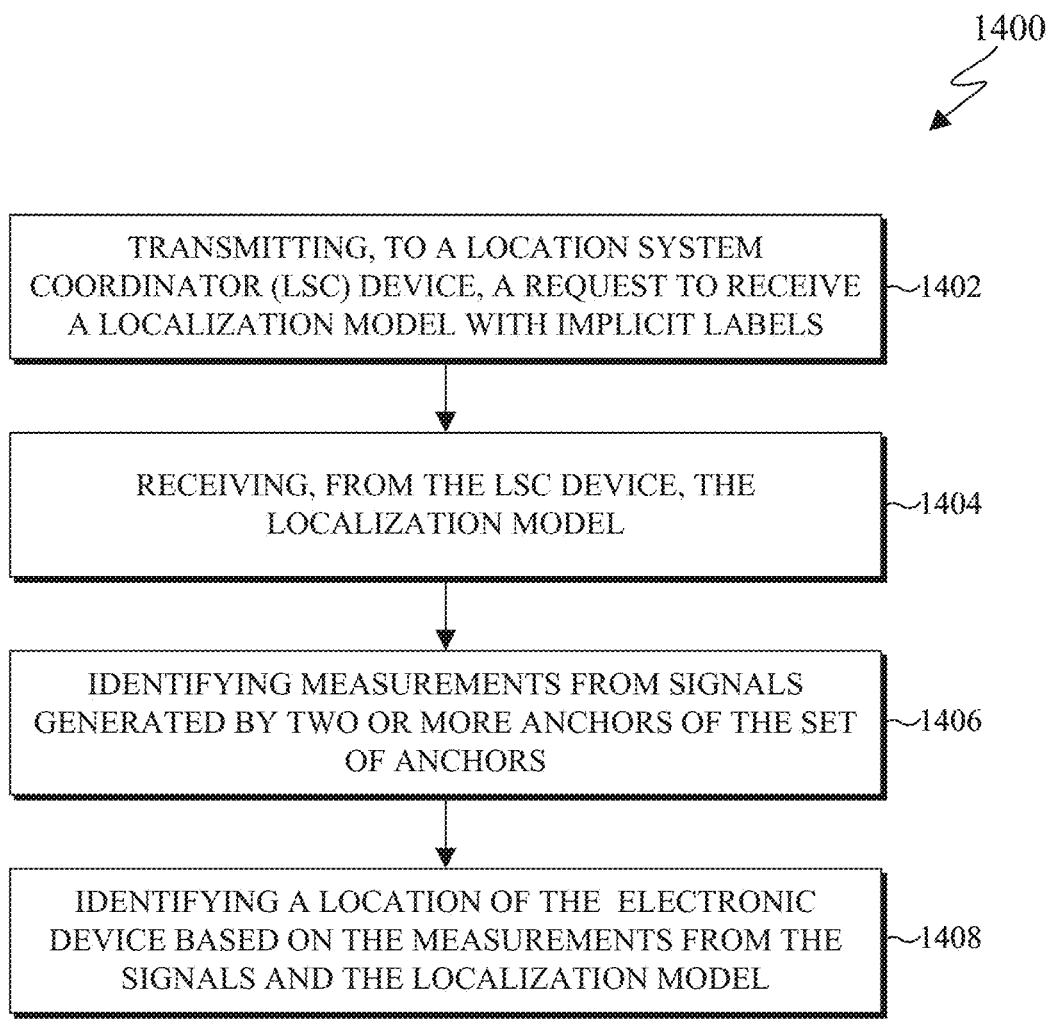
FIG. 14 illustrates an example method for localization by the electronic device in accordance with an embodiment of this disclosure.

FIG. 14 illustrates an example 1400 method for localization by the electronic device 720 in accordance with an embodiment of this disclosure. The method 1400 is described as implemented by any one of the client device 106-116 of FIG. 1, the electronic device 408 of FIG. 4, and the electronic device 720 of FIG. 7B and can include internal components similar to that of the electronic device 301 of FIG. 3. However, the method 1400 as shown in FIG. 14 could be used with any other suitable electronic device and in any suitable system.

In step 1402, the electronic device determines whether a localization service is available within an area. In response to determining that the localization service is available within the area, the electronic device transmits to a LSC a request to receive a localization model. The localization model can be generated by the LSC and include implicit labels based on signals that the LSC received from anchors that are positioned throughout the area.

In certain embodiments, to determine whether the localization service is available within the area, the electronic device can transmit an inquiry inquiring as to whether the area supports localization services. After the electronic device transmits the inquiry, the electronic device can receive a response from the LSC indicating that a localization service is available for the electronic device.

In other embodiments, to determine whether the localization service is available within the area, the electronic device can receive an announcement indicating that a localization service is available for the area. For example, upon joining the wireless network for the area, the electronic device can receive the announcement indicating that the localization service is available for the area. The announcement can also include other information associated with the wireless network and the area.

In step 1404, the electronic device receives the localization model from the LSC. In step 1406, the electronic device receives signals from two or more anchors from the anchors that are located throughout the area. The electronic device can then identify measurements from the received signals. In step 1408, the electronic device identifies its location within the area based on the identified measurements from the anchors and the localization model received from the LSC.

In certain embodiments, to identify its location the electronic device can receive an input indicating an explicit location within the area. The electronic device can map one of the implicit labels included in the localization model to the explicit label.

In certain embodiments, to identify its location the electronic device can capture an image representing a portion of the area. The electronic device can identify a room type based on the image. For example, the electronic device can determine whether the room is a bathroom, a kitchen, a bedroom, and the like, based on the content within the image. The electronic device then assigns an explicit label that corresponds to the room type to the implicit label at the location where the electronic device is located.

Although FIGS. 13 and 14 illustrates example methods, various changes may be made to FIGS. 13 and 14. For example, while the methods 1300 and 1400 are shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for localization, the method comprising:
obtaining a request to localize an electronic device within an area, wherein the area includes a set of anchors, wherein the request to localize is transmitted from the electronic device;
determining whether to grant or reject the request, including rejecting the request or determining to transmit a first message that indicates the request is granted;
transmitting the first message to the electronic device and a second message to the set of anchors based on the determination to grant the request, wherein the first message includes a time for the electronic device to transmit a measurement signal and the second message includes the time for the set of anchors to receive the measurement signal from the electronic device;
receiving, from the set of anchors, signal information associated with the measurement signal;
identifying a location of the electronic device within the area based on the signal information; and
transmitting, to the electronic device, the location of the electronic device within the area.

2. The method of claim 1, further comprising:
obtaining information from the set of anchors indicating times that the set of anchors are available for localization; and
after determining to grant the request, determining the time included in the first and second messages based on the information from the set of anchors,
wherein obtaining the request to localize comprises receiving the request to localize forwarded from one or more anchors among the set of anchors that received the request to localize transmitted from the electronic device to a localization coordinating device.

3. The method of claim 1, further comprising
obtaining, from a second electronic device, a message indicating a device type of the second electronic device; and
in response to determining that the second electronic device is an immobile device, based on the device type, registering the second electronic device as one of the set of anchors.

4. The method of claim 1, further comprising:
obtaining, from a second electronic device, a message including a state of the second electronic device and a device type;
in response to determining that the second electronic device is a mobile device, based on the device type, determining whether the state of the second electronic device matches one or more predefined criteria;
in response to determining that the state of the second electronic device matches the predefined criteria, receiving, from the second electronic device, information representing measurements; and
generating a localization model based on the measurements received from the second electronic device and measurement received from the set of anchors that are positioned throughout the area.

5. The method of claim 1, further comprising:
generating multiple localization models based on measurement signals received from different subsets of anchors from the set of anchors;
receiving the signal information from a portion of the set of anchors; and
selecting a first localization model of the multiple localization models corresponding to the signal information received from the portion of the set of anchors that matches one of the different subsets of anchors used to generate the first localization model.

6. The method of claim 1, further comprising:
generating a localization model with implicit labels based on measurement received from the set of anchors that are positioned throughout the area; and
identifying the location of the electronic device based on the localization model.

7. The method of claim 6, wherein:
generating the localization model comprises:
transmitting a request for data collection for generating the localization model,
receiving responses from multiple electronic devices, the responses from each of the multiple electronic devices include a device state and a device type,
generating a schedule for requesting measurements from at least one device of the multiple electronic devices that satisfy one or more predefined criteria based on the device type and the device state,
transmitting, to the set of anchors and the at least one device, requests for the measurements according to the schedule,
after transmitting the request for the measurements according to the schedule, receiving the measurements from the set of anchors, wherein the measurements are based on signals transmitted from the at least one device to the set of anchors, and
generating the localization model based on the measurements received from the set of anchors; and
the method further comprises clustering additional measurements from one or more devices to identify the implicit labels.

8. A localization coordinating device comprising:
a transceiver; and
a processor operably coupled with the transceiver and configured to:
obtain a request to localize an electronic device within an area, wherein the area includes a set of anchors, wherein the request to localize is transmitted from the electronic device;
determine whether to grant or reject the request, wherein to determine whether to grant or reject the request, the processor is configured to reject the request or to determine to transmit a first message that indicates the request is granted;
transmit the first message to the electronic device and a second message to the set of anchors based on the determination to grant the request, wherein the first message includes a time for the electronic device to transmit a measurement signal and the second message includes the time for the set of anchors to receive the measurement signal from the electronic device;
receive, from the set of anchors, signal information associated with the measurement signal;
identify a location of the electronic device within the area based on the signal information; and
transmit, to the electronic device, the location of the electronic device within the area.

9. The localization coordinating device of claim 8, wherein the processor is further configured to:
obtain information from the set of anchors indicating times that the set of anchors are available for localization; and
after the determination to grant the request, determine the time included in the first and second messages based on the information from the set of anchors,
wherein the request to localize transmitted from the electronic device is received by one or more anchors among the set of anchors, and forwarded to the localization coordinating device by the one or more anchors that received the request to localize the electronic device.

10. The localization coordinating device of claim 8, wherein the processor is further configured to
obtain, from a second electronic device, a message indicating a device type of the second electronic device; and
in response to determining that the second electronic device is an immobile device, based on the device type, register the second electronic device as one of the set of anchors.

11. The localization coordinating device of claim 8, wherein the processor is further configured to:
obtain, from a second electronic device, a message including a state of the second electronic device and a device type;
in response to determining that the second electronic device is a mobile device, based on the device type, determine whether the state of the second electronic device matches one or more predefined criteria;
in response to determining that the state of the second electronic device matches the predefined criteria, receive, from the second electronic device, information representing measurements; and
generate a localization model based on the measurements received from the second electronic device and measurement received from the set of anchors that are positioned throughout the area.

12. The localization coordinating device of claim 8, wherein the processor is further configured to:
generate multiple localization models based on measurement signals received from different subsets of anchors from the set of anchors;
receive the signal information from a portion of the set of anchors; and
select a first localization model of the multiple localization models corresponding to the signal information received from the portion of the set of anchors that matches one of the different subsets of anchors used to generate the first localization model.

13. The localization coordinating device of claim 8, wherein the processor is further configured to:
generate a localization model with implicit labels based on measurement received from the set of anchors that are positioned throughout the area; and
identify the location of the electronic device based on the localization model.

14. The localization coordinating device of claim 13, wherein:
to generate the localization model, the processor is configured to:
transmit a request for data collection for generating the localization model,
receive responses from multiple electronic devices, the responses from each of the multiple electronic devices include a device state and a device type,
generate a schedule for requesting measurements from at least one device of the multiple electronic devices that satisfy a predefined criteria based on the device type and the device state,
transmit, to the set of anchors and the at least one device, requests for the measurements according to the schedule, after transmitting the request for the measurements according to the schedule, receive the measurements from the set of anchors, wherein the measurements are based on signals transmitted from the at least one device to the set of anchors, and generate the localization model based on the measurements received from the set of anchors; and the processor is further configured to cluster additional measurements from one or more devices to identify the implicit labels.

15. A non-transitory computer readable medium embodying a computer program, the computer program comprising computer readable program code that, when executed by a processor of a localization coordinating device, causes the processor to:

obtain a request to localize an electronic device within an area, wherein the area includes a set of anchors, wherein the request to localize is transmitted from the electronic device;

determine whether to grant or reject the request, wherein to determine whether to grant or reject the request, the processor is configured to reject the request or to determine to transmit a first message that indicates the request is granted;

transmit the first message to the electronic device and a second message to the set of anchors based on the determination to grant the request, wherein the first message includes a time for the electronic device to transmit a measurement signal and the second message includes the time for the set of anchors to receive the measurement signal from the electronic device;

receive, from the set of anchors, signal information associated with the measurement signal;

identify a location of the electronic device within the area based on the signal information; and transmit, to the electronic device, the location of the electronic device within the area.

16. The non-transitory computer readable medium of claim 15, wherein the computer readable program code, when executed by the processor, further causes the processor to:

obtain information from the set of anchors indicating times that the set of anchors are available for localization; and after the determination to grant the request, determine the time included in the first and second messages based on the information from the set of anchors, wherein obtaining the request to localize comprises receiving the request to localize forwarded from one or more anchors among the set of anchors that received the request to localize transmitted from the electronic device to a localization coordinating device.

17. The non-transitory computer readable medium of claim 15, wherein the computer readable program code, when executed by the processor, further causes the processor to:

obtain, from a second electronic device, a message indicating a device type of the second electronic device; and in response to determining that the second electronic device is an immobile device, based on the device type, register the second electronic device as one of the set of anchors.

18. The non-transitory computer readable medium of claim 15, wherein the computer readable program code, when executed by the processor, further causes the processor to:

obtain, from a second electronic device, a message including a state of the second electronic device and a device type;

in response to determining that the second electronic device is a mobile device, based on the device type, determine whether the state of the second electronic device matches a predefined criteria;

in response to determining that the state of the second electronic device matches the predefined criteria, receive, from the second electronic device, information representing measurements; and generate a localization model based on the measurements received from the second electronic device and measurement received from the set of anchors that are positioned throughout the area.

19. The non-transitory computer readable medium of claim 15, wherein the computer readable program code, when executed by the processor, further causes the processor to:

generate a localization model with implicit labels based on measurement received from the set of anchors that are positioned throughout the area; and identify the location of the electronic device based on the localization model.

20. The non-transitory computer readable medium of claim 19, wherein:

to generate the localization model, the computer readable program code, when executed by the processor, further causes the processor to:

transmit a request for data collection for generating the localization model, receive responses from multiple electronic devices, the responses from each of the multiple electronic devices include a device state and a device type, generate a schedule for requesting measurements from at least one device of the multiple electronic devices that satisfy a predefined criteria based on the device type and the device state, transmit, to the set of anchors and the at least one device, requests for the measurements according to the schedule, after transmitting the request for the measurements according to the schedule, receive the measurements from the set of anchors, wherein the measurements are based on signals transmitted from the at least one device to the set of anchors, and generate the localization model based on the measurements received from the set of anchors; and the computer readable program code, when executed by the processor, further causes the processor to cluster additional measurements from one or more devices to identify the implicit labels.

* * * * *